US012645162B2

(12) United States Patent
Fukudome et al.

(10) Patent No.: US 12,645,162 B2
(45) Date of Patent: Jun. 2, 2026

(54) TONER

(71) Applicant: CANON KABUSHIKI KAISHA, Tokyo (JP)

(72) Inventors: Kosuke Fukudome, Tokyo (JP); Kenta Kamikura, Kanagawa (JP); Kozue Uratani, Shizuoka (JP); Tetsuya Kinumatsu, Shizuoka (JP); Yuta Komiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 751 days.

(21) Appl. No.: 18/046,590

(22) Filed: Oct. 14, 2022

(65) Prior Publication Data

US 2023/0117448 A1 Apr. 20, 2023

(30) Foreign Application Priority Data

Oct. 20, 2021 (JP) ................................ 2021-171590

(51) Int. Cl.

*G03G 9/093* (2006.01)
*G03G 9/08* (2006.01)
*G03G 9/087* (2006.01)
*G03G 9/097* (2006.01)

(52) U.S. Cl.

CPC ....... *G03G 9/09321* (2013.01); *G03G 9/0821* (2013.01); *G03G 9/0827* (2013.01); *G03G 9/08728* (2013.01); *G03G 9/09733* (2013.01)

(58) Field of Classification Search

CPC ............ G03G 9/09321; G03G 9/0821; G03G 9/0827; G03G 9/09733; G03G 9/087; G03G 9/097

See application file for complete search history.

(56) References Cited

U.S. PATENT DOCUMENTS

| | | | |
|---|---|---|---|
| 8,603,712 | B2 | 12/2013 | Aoki |
| 8,614,044 | B2 | 12/2013 | Matsui |
| 8,741,519 | B2 | 6/2014 | Watanabe |
| 8,785,101 | B2 | 7/2014 | Kaya |
| 8,828,639 | B2 | 9/2014 | Kamikura |
| 8,846,284 | B2 | 9/2014 | Kinumatsu |
| 8,918,035 | B2 | 12/2014 | Hasegawa |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,152,065 | B2 | 10/2015 | Sano |
| 9,170,509 | B2 | 10/2015 | Masuda et al. |
| 9,213,250 | B2 | 12/2015 | Nomura |
| 9,213,251 | B2 | 12/2015 | Ohmori |
| 9,239,528 | B2 | 1/2016 | Hasegawa |
| 9,244,371 | B2 | 1/2016 | Suzumura |
| 9,256,148 | B2 | 2/2016 | Fujikawa |
| 9,261,806 | B2 | 2/2016 | Moribe |
| 9,285,697 | B2 | 3/2016 | Fukudome |
| 9,304,422 | B2 | 4/2016 | Matsui |
| 9,309,349 | B2 | 4/2016 | Watanabe |
| 9,348,246 | B2 | 5/2016 | Magome |
| 9,354,545 | B2 | 5/2016 | Matsui |
| 9,377,708 | B2 | 6/2016 | Magome |
| 9,423,711 | B2 | 8/2016 | Uratani |
| 9,429,860 | B2 | 8/2016 | Kinumatsu |
| 9,442,416 | B2 | 9/2016 | Magome |
| 9,470,993 | B2 | 10/2016 | Nishikawa |
| 9,594,323 | B2 | 3/2017 | Fujikawa |
| 9,606,462 | B2 | 3/2017 | Nomura |
| 9,625,842 | B2 | 4/2017 | Uratani |
| 9,625,844 | B2 | 4/2017 | Kaya |
| 9,658,546 | B2 | 5/2017 | Tanaka |
| 9,658,554 | B2 | 5/2017 | Kinumatsu |
| 9,798,256 | B2 | 10/2017 | Kosaki |
| 9,798,262 | B2 | 10/2017 | Toyoizumi |
| 9,804,514 | B2 | 10/2017 | Suzumura |

(Continued)

FOREIGN PATENT DOCUMENTS

| | | |
|---|---|---|
| JP | 4-242262 A | 8/1992 |
| JP | 8-320596 A | 12/1996 |

(Continued)

OTHER PUBLICATIONS

Machine translation of JP2014-035506A, Sugama et al (Year: 2025).*
U.S. Appl. No. 17/935,721, Takashi Kenmoku, filed Sep. 27, 2022.
U.S. Appl. No. 17/936,104, Tatsuya Saeki, filed Sep. 28, 2022.
U.S. Appl. No. 17/936,943, Kozue Uratani, filed Sep. 30, 2022.
U.S. Appl. No. 18/046,585, Yuta Komiya, filed Oct. 14, 2022.
U.S. Appl. No. 18/046,597, Hiroki Kagawa, filed Oct. 14, 2022.

(Continued)

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin and an ester compound, wherein:

the binder resin comprises a resin A comprising a specific amount of a long-chain acrylate unit and a styrene-based monomer unit, and a resin B comprising a specific monomer unit in a specific amount;

the ester compound has an alkyl chain with a specific chain length, a content of the resin A in the chloroform-soluble portion of the toner particles is 60% by mass or more; and using SPm $(J/cm^3)^{1/2}$ for a SP value of the long-chain acrylate unit and using SPw $(J/cm^3)^{1/2}$ for a SP value of the ester compound, SPm is 18.00 to 19.00, and SPm and SPw satisfy formula (a).

$$|SPm-SPw|\leq 1.50 \quad (a)$$

8 Claims, No Drawings

(56) References Cited

U.S. PATENT DOCUMENTS

| | | | |
|---|---|---|---|
| 9,811,016 B2 | 11/2017 | Aoki | |
| 9,823,595 B2 | 11/2017 | Toyoizumi | |
| 9,841,692 B2 | 12/2017 | Hasegawa | |
| 9,857,707 B2 | 1/2018 | Tsuda | |
| 9,857,713 B2 | 1/2018 | Kosaki | |
| 9,869,943 B2 | 1/2018 | Aoki | |
| 9,880,478 B2 | 1/2018 | Shimano | |
| 9,952,523 B2 | 4/2018 | Shimano | |
| 9,964,874 B2 | 5/2018 | Suzumura | |
| 9,971,263 B2 | 5/2018 | Fukudome | |
| 10,101,683 B2 | 10/2018 | Nishikawa | |
| 10,197,934 B2 | 2/2019 | Matsui | |
| 10,228,627 B2 | 3/2019 | Nagashima | |
| 10,241,430 B2 | 3/2019 | Kimura | |
| 10,289,016 B2 | 5/2019 | Fukudome | |
| 10,295,921 B2 | 5/2019 | Ohmori | |
| 10,303,074 B2 | 5/2019 | Yamawaki | |
| 10,310,396 B2 | 6/2019 | Kamikura | |
| 10,310,397 B2 | 6/2019 | Sano | |
| 10,338,487 B2 | 7/2019 | Kamikura | |
| 10,345,726 B2 | 7/2019 | Nakamura | |
| 10,353,308 B2 | 7/2019 | Hatakeyama | |
| 10,401,750 B2 | 9/2019 | Nakamura | |
| 10,409,180 B2 | 9/2019 | Koji | |
| 10,429,757 B2 | 10/2019 | Yoshida | |
| 10,503,090 B2 | 12/2019 | Tominaga | |
| 10,539,893 B2 | 1/2020 | Tanaka | |
| 10,539,899 B2 | 1/2020 | Nakamura | |
| 10,545,420 B2 | 1/2020 | Kinumatsu | |
| 10,545,422 B2 | 1/2020 | Yamawaki | |
| 10,551,758 B2 | 2/2020 | Tanaka | |
| 10,578,990 B2 | 3/2020 | Tsuda | |
| 10,635,010 B2 | 4/2020 | Kamikura | |
| 10,698,327 B2 | 6/2020 | Nagashima | |
| 10,732,530 B2 | 8/2020 | Matsui | |
| 10,732,532 B1 | 8/2020 | Sugawara et al. | |
| 10,747,134 B2 | 8/2020 | Watanabe | |
| 10,768,540 B2 | 9/2020 | Watanabe | |
| 10,782,623 B2 | 9/2020 | Yoshiba | |
| 10,845,722 B2 | 11/2020 | Nishikawa | |
| 10,859,933 B2 | 12/2020 | Kinumatsu | |
| 10,877,387 B2 | 12/2020 | Fukudome | |
| 10,877,388 B2 | 12/2020 | Aoki | |
| 10,877,389 B2 | 12/2020 | Kamikura | |
| 10,895,815 B2 | 1/2021 | Kamikura | |
| 10,969,704 B2 | 4/2021 | Kagawa | |
| 11,003,103 B2 | 5/2021 | Kinmatsu | |
| 11,092,905 B2 | 8/2021 | Fukudome | |
| 11,099,493 B2 | 8/2021 | Komiya | |
| 11,112,708 B2 | 9/2021 | Uratani | |
| 11,112,709 B2 | 9/2021 | Saeki | |
| 11,112,713 B2 | 9/2021 | Akiyama | |
| 11,169,458 B2 | 11/2021 | Toyoizumi | |
| 11,175,600 B2 | 11/2021 | Uchiyama | |
| 11,181,839 B2 | 11/2021 | Yamashita | |
| 11,181,840 B2 | 11/2021 | Nagata | |
| 11,181,844 B2 | 11/2021 | Nagaoka | |
| 11,181,846 B2 | 11/2021 | Kinumatsu | |
| 11,256,187 B2 | 2/2022 | Ogaki | |
| 11,287,758 B2 | 3/2022 | Matsui | |
| 11,314,178 B2 | 4/2022 | Kenmoku | |
| 11,333,989 B2 | 5/2022 | Unno | |
| 11,347,157 B2 | 5/2022 | Kamikura | |
| 11,415,902 B2 | 8/2022 | Watanabe | |
| 11,531,282 B2 | 12/2022 | Kamikura | |
| 2002/0009661 A1 | 1/2002 | Hashimoto | |
| 2004/0013961 A1* | 1/2004 | Niwa et al. | G03G 9/097 |
| 2015/0185648 A1 | 7/2015 | Uratani | |
| 2016/0378003 A1 | 12/2016 | Arimura | |
| 2017/0160662 A1 | 6/2017 | Nagashima | |
| 2017/0307991 A1 | 10/2017 | Kadonome et al. | |
| 2019/0056678 A1 | 2/2019 | Washino et al. | |
| 2019/0094732 A1 | 3/2019 | Matsushima et al. | |
| 2019/0137900 A1 | 5/2019 | Nakagawa | |
| 2021/0080846 A1 | 3/2021 | Mizuguchi | |
| 2021/0181647 A1 | 6/2021 | Hashimoto et al. | |
| 2021/0255557 A1 | 8/2021 | Watanabe | |
| 2021/0302856 A1 | 9/2021 | Nagashima | |
| 2022/0146952 A1 | 5/2022 | Komiya | |
| 2022/0146955 A1 | 5/2022 | Nozaki | |
| 2022/0206402 A1 | 6/2022 | Uratani | |
| 2022/0214629 A1 | 7/2022 | Kenmoku | |
| 2022/0214630 A1 | 7/2022 | Kamikura | |
| 2022/0373906 A1 | 11/2022 | Ohmori | |
| 2022/0373916 A1 | 11/2022 | Adachi | |

FOREIGN PATENT DOCUMENTS

| | | | | |
|---|---|---|---|---|
| JP | 2002-251037 A | | 9/2002 | |
| JP | 2007-47636 A | | 2/2007 | |
| JP | 2009-163263 A | | 7/2009 | |
| JP | 2012-198569 A | | 10/2012 | |
| JP | 2014-035506 A | * | 2/2014 | G03G 9/087 |
| JP | 2014-35506 A | | 2/2014 | |
| JP | 2019-40024 A | | 3/2019 | |
| JP | 2019-144364 A | | 8/2019 | |
| JP | 2020-16822 A | | 1/2020 | |
| JP | 2020-187225 A | | 11/2020 | |
| WO | 2013/047296 A1 | | 4/2013 | |

OTHER PUBLICATIONS

U.S. Appl. No. 18/053,846, Kenta Kamikura, filed Nov. 9, 2022.

Robert F. Fedors, "A Method for Estimating Both the Solubility Parameters and Molar Volumes of Liquids", Polymer Engineering and Science, vol. 14, No. 2 (1974) 147-54.

* cited by examiner

TONER

BACKGROUND OF THE INVENTION

Field of the Invention

The present disclosure relates to the toner used in recording methods that utilize an electrophotographic method, electrostatic recording method, or a toner jet system recording method.

Description of the Related Art

The modes of use of electrophotographic system-based printers have also been undergoing diversification in recent years due to the diversification of work practices and modalities. Besides use in conventional large offices that have well-regulated work environments, use in small offices and in remote-work settings has also been increasing, and the requirements for printer downsizing are also increasing more than ever. In addition, it is necessary to anticipate use in a wide range of regions, from developed countries to emerging countries, during the course of globalization, and there is demand for printers that can output images of stable quality in both low-temperature, low-humidity environments and high-temperature, high-humidity environments.

The media used are also undergoing diversification among individual countries, and there is demand for printers that can output images of stable quality with respect to media that exhibit a different paper smoothness and/or that have different fillers in the paper. From the perspective of responding to printer downsizing, attention is being directed to electrophotographic process-based printers from which the cleaning system has been eliminated, which can reduce the number of parts and waste toner.

However, for example, when a high talc content paper (also referred to hereafter as "talc paper") is used and the talc in the paper transfers to the photosensitive drum, the talc will then not be removed by a cleaning step. Due to this, the talc can transfer to the charging member and into the developer container, causing a reduction in the triboelectric charging of the toner and a reduction in image quality. Viewed in terms of energy conservation and environmental friendliness, the ability to fix toner to paper at lower temperatures is required, and improvements in the melting behavior of toner are also required.

In order to improve the charging behavior of toner and improve its low-temperature fixing behavior in order to respond to such demands, Japanese Patent Application Publication No. 2012-198569 describes a toner that contains a binder resin and a polyfunctional ester wax and that contains a positive charge control resin that contains a unit derived from styrene and a unit derived from a quaternary ammonium salt group.

On the other hand, Japanese Patent Application No. 2014-035506 describes a toner for electrostatic image development, wherein this toner characteristically contains a crystalline ester compound and contains, as binder resin, a styrene-acrylic resin having a structural unit deriving from an alkyl (meth)acrylate ester monomer in which the number of carbon atoms in the alkyl group is from 8 to 22 and having a structural unit deriving from an alkyl (meth)acrylate ester monomer in which the number of carbon atoms in the alkyl group is from 1 to 7.

SUMMARY OF THE INVENTION

Japanese Patent Application No. 2012-198569 certainly describes that good charging characteristics and a good printing durability in a 23° C./50% RH environment are provided by the incorporation in toner of a positive charge control resin. However, a positive charge control resin containing a quaternary ammonium salt group exhibits a high hygroscopicity, and due to this the charging performance readily declines on the occasion of long-term standing in a high-temperature, high-humidity environment. As a consequence, there is room for improvement with regard to image fogging for the case of use in a severe environment, i.e., the use of talc paper in a cleanerless system.

In addition, the toner tends to readily undergo charge up when the continuous printing durability is evaluated in a low-temperature, low-humidity environment. As a consequence, there is room for improvement with regard to nontransfer fogging for the case of use in a severe environment, i.e., the use of talc paper in a cleanerless system.

Through the use of the styrene-acrylic resin in Japanese Patent Application No. 2014-035506, on the other hand, the affinity between the crystalline ester compound and the binder resin can be controlled and the melting characteristics of the toner can be improved, and as a result the low-temperature fixability can be enhanced. When such a toner is used as a two-component developer, which provides abundant triboelectric charging opportunities, a constant image quality can be maintained even in a high-temperature, high-humidity environment.

However, when a cleanerless system is adopted with single-component development, where the triboelectric charging opportunities are diminished, there is room for improvement in terms of maintaining a stable image quality when the continuous printing durability is evaluated in a high-temperature, high-humidity environment and in a low-temperature, low-humidity environment. Moreover, the toner in Japanese Patent Application No. 2014-035506 is a negative-charging toner, and no suggestion is made with regard to a positive charge control resin.

Thus, in order to accommodate cleanerless systems and respond to energy conservation, there is still room for improvement with regard to art that provides, at high levels for each, both low-temperature fixability and charging performance in high-temperature, high-humidity environments and in low-temperature, low-humidity environments.

The present disclosure provides a toner that contains a positive charge control resin, wherein the toner exhibits both low-temperature fixability and charging performance in high-temperature, high-humidity environments and in low-temperature, low-humidity environments.

The present disclosure relates to a toner comprising a toner particle comprising a binder resin and an ester compound, wherein:

the binder resin comprises a resin A and a resin B;

the resin A comprises a monomer unit represented by formula (1) and a monomer unit represented by formula (2), where, in formula (1), $R^1$ represents a hydrogen atom or methyl group and $R^2$ represents a straight-chain alkyl group having 10 to 14 carbon atoms, and in formula (2), $R^{21}$ represents a hydrogen atom or methyl group;

the resin B comprises a monomer unit represented by formula (3) and a monomer unit represented by formula (4), where, in formula (3), $R^{31}$ represents a hydrogen atom or methyl group, $R^{32}$ represents a optionally halogen-substituted straight-chain or branched $C_{1-3}$ alkylene group, $R^{33}$ to $R^{35}$ each independently represent a benzyl group, phenethyl group, or straight-chain, branched, or cyclic $C_{1-6}$ alkyl group, and X represents a counteranion, and in formula (4), $R^{22}$ represents a hydrogen atom or methyl group;

the ester compound is at least one ester compound selected from the group consisting of ester compounds represented by formula (5), ester compounds represented by formula (6), and ester compounds represented by formula (7), where, in formulas (5), (6), and (7), $R^{36}$ and $R^{41}$ represent alkylene groups having 2 to 8 carbon atoms, and $R^{37}$, $R^{38}$, $R^{42}$, $R^{43}$, $R^{51}$, and $R^{52}$ each independently represent a straight-chain alkyl group having 14 to 24 carbon atoms;

a content of the resin A in a chloroform-soluble matter of the toner particle is at least 60 mass %;

a content of the monomer unit represented by formula (1) in the resin A is 1.0 to 15.0 mass %;

a content of the monomer unit represented by formula (2) in the resin A is at least 48.0 mass %;

a content of the monomer unit represented by formula (4) in the resin B is at least 48.0 mass %; and using SPm $(J/cm^3)^{1/2}$ for a SP value of the monomer unit represented by formula (1) and using SPw $(J/cm^3)^{1/2}$ for a SP value of the ester compound, SPm is 18.00 to 19.00, and SPm and SPw satisfy formula (a).

$$|SPm-SPw| \leq 1.50 \quad (a)$$

(1)

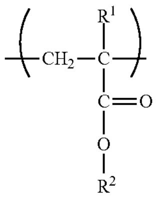

(2)

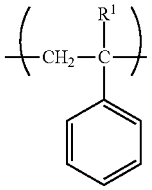

(3)

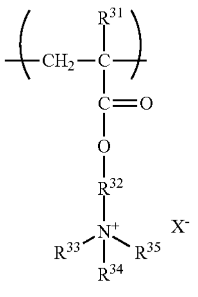

(4)

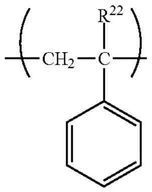

-continued (5)

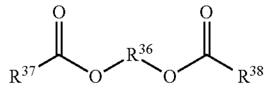

(6)

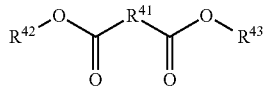

(7)

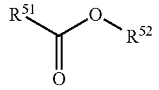

The present disclosure can thus provide a toner that contains a positive charge control resin, wherein the toner exhibits both low-temperature fixability and charging performance in high-temperature, high-humidity environments and in low-temperature, low-humidity environments.

Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily.

The term "monomer unit" describes a reacted form of a monomeric material in a polymer, and one carbon-carbon bonded section in a principal chain of polymerized vinyl-based monomers in a polymer is given as one unit. The vinyl-based monomer can be represented by the following formula (Z).

(z)

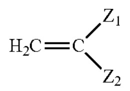

In formula (Z), $Z_1$ represents a hydrogen atom or alkyl group (preferably an alkyl group having 1 to 3 carbon atoms, or more preferably a methyl group), and $Z_2$ represents any substituent.

The toner contains the resin B, which has a positive charge control behavior due to the monomer unit represented by formula (3), and as a consequence the toner has a positive charging behavior. This toner has a positive charging behavior and has charging characteristics that are stable in high-temperature, high-humidity environments and low-temperature, low-humidity environments. As a consequence, a good quality image can be obtained in cleanerless systems in a broad range of use environments, even when a high-print-count durability test is run with talc paper.

According to investigations by the present inventors, it has been found that, when a printing durability test is run using talc paper, the talc transfers to the photosensitive drum, contaminating the charging member or the toner charging member in the developing device and ultimately reducing the charging performance of the toner, and image fogging is readily produced when the print count becomes large. It was also found that, since talc is negative, electrophotographic systems that use a positive charging toner tend to be able to provide a better inhibition of talc transfer to the photosensitive drum than electrophotographic systems that use a negative charging toner.

However, it was found that positive charging toner having the monomer unit represented by formula (3), while having a good charging performance in a normal-temperature, normal-humidity environment, still poses concerns with regard to environmental stability. According to the results of investigations by the present inventors, because the monomer unit represented by formula (3) has a high hygroscopicity, for example, in the case of long-term standing in a high-temperature, high-humidity environment, a trend occurs wherein the charging performance declines and fogging in nonimage regions is readily produced.

On the other hand, when a continuous high-print-count durability test is carried out in a low-temperature, low-humidity environment, toner charge up ultimately occurs and the transfer efficiency declines. It was found that, as a consequence, when the toner is used in a cleanerless system, images are then readily produced in which nonimage areas are contaminated by untransferred toner (nontransfer fogging).

The present inventors carried out intensive investigations into these problems, and as a result discovered the importance of incorporating a prescribed ester compound, a prescribed resin A, and a resin B that is a positive charging resin containing the specific structure described above. It was also discovered that, by controlling the occurrence ratio of the monomer units and resin in the chloroform-soluble matter of the toner particle, an excellent charge stability in low-temperature, low-humidity environments and high-temperature, high-humidity environments is provided and an excellent low-temperature fixability by the toner is also provided.

The present disclosure relates to a toner comprising a toner particle comprising a binder resin and an ester compound, wherein:

the binder resin comprises a resin A and a resin B;

the resin A comprises a monomer unit represented by formula (1) and a monomer unit represented by formula (2), in formula (1), $R^1$ represents a hydrogen atom or methyl group and $R^2$ represents a straight-chain alkyl group having 10 to 14 carbon atoms, and in formula (2), $R^{21}$ represents a hydrogen atom or methyl group;

the resin B comprises a monomer unit represented by formula (3) and a monomer unit represented by formula (4), in formula (3), $R^{31}$ represents a hydrogen atom or methyl group, $R^{32}$ represents a optionally halogen-substituted straight-chain or branched $C_{1-3}$ alkylene group, $R^{33}$ to $R^{35}$ each independently represent a benzyl group, phenethyl group, or straight-chain, branched, or cyclic $C_{1-6}$ alkyl group, and X represents a counteranion, and in formula (4), $R^{22}$ represents a hydrogen atom or methyl group;

the ester compound is at least one ester compound selected from the group consisting of ester compounds represented by formula (5), ester compounds represented by formula (6), and ester compounds represented by formula (7), in formulas (5), (6), and (7), $R^{36}$ and $R^{41}$ represent alkylene groups having 2 to 8 carbon atoms, and $R^{37}$, $R^{38}$, $R^{42}$, $R^{43}$, $R^{51}$, and $R^{52}$ each independently represent a straight-chain alkyl group having 14 to 24 carbon atoms;

a content of the resin A in a chloroform-soluble matter of the toner particle is at least 60 mass %;

a content of the monomer unit represented by formula (1) in the resin A is 1.0 to 15.0 mass %;

a content of the monomer unit represented by formula (2) in the resin A is at least 48.0 mass %;

a content of the monomer unit represented by formula (4) in the resin B is at least 48.0 mass %; and using SPm $(J/cm^3)^{1/2}$ for a SP value of the monomer unit represented by formula (1) and using SPw $(J/cm^3)^{1/2}$ for a SP value of the ester compound, SPm is 18.00 to 19.00, and SPm and SPw satisfy formula (a).

$$|SPm-SPw| \leq 1.50 \quad \text{(a)}$$

(1)

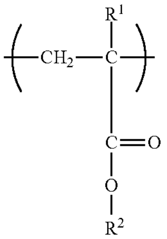

(2)

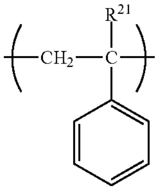

(3)

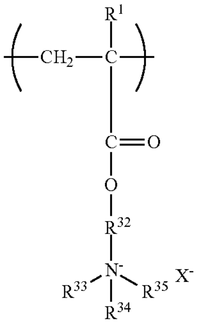

(4)

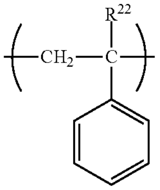

(5)

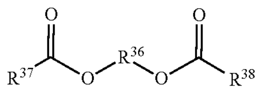

(6)

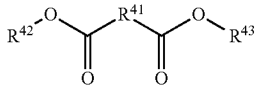

-continued (7)

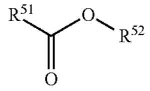

The toner particle contains a binder resin and an ester compound. The binder resin contains the resin A and the resin B. The toner thus contains the resin A, the resin B, and an ester compound. The ability to exhibit a stable positive charging performance in both low-temperature, low-humidity environments and high-temperature, high-humidity environments because these three materials are all present in the toner particle will be described first.

The monomer unit represented by formula (1) that is present in the resin A is a monomer unit provided by an acrylate or methacrylate that has a straight-chain alkyl group in which the number of carbon atoms ($R^2$) is from 10 to 14. This monomer unit is also referred to in the following as the "long-chain acrylate unit".

According to the results of investigations by the present inventors, the ester compound exhibits a high affinity with the long-chain acrylate unit with formula (1) present in the resin A, and as a consequence, when both are present together in the toner particle, a eutectic structure can be formed in which the ester compound is oriented in the neighborhood of the long-chain acrylate unit. Investigations by the present inventors found that this eutectic structure is a highly hydrophobic, fine, and dense structure and has the effect of enabling an inhibition of moisture adsorption at the toner particle surface.

In addition, due to synergy between this eutectic structure and the monomer unit represented by formula (3) in the high-chargeability resin B, the charge quantity on the toner can be maintained in a suitable state and image fogging can be suppressed even in the case of long-term standing in a high-temperature, high-humidity environment. Moreover, monomer units in this toner, i.e., formula (2) in resin A and formula (4) in resin B, have the same structure, or very similar structures, in both, and as a consequence, the two undergo orientation and a packed state can be formed due to the $\pi$-$\pi$ interactions of the phenyl groups in formulas (2) and (4).

This packed structure functions to promote the transfer of charge between the molecular chains of the resin A and the resin B in the toner. As a consequence, even in the case of evaluation by a high-print-count durability test in a low-temperature, low-humidity environment, charge up of the toner can be suppressed, a high transfer efficiency can be maintained, and nontransfer fogging can also be suppressed.

The mechanisms that provide an excellent low-temperature fixability for the toner will now be considered. The present inventors believe that toner having an excellent low-temperature fixability is obtained by having the toner have the packed structure generated by the aforementioned $\pi$-$\pi$ interaction and the eutectic structure formed as described above by the long-chain acrylate unit and the ester compound.

Specifically, due to the high affinity between the ester compound and the long-chain acrylate unit with formula (1), when the toner is melted in the fixing unit nip, the resin A is rapidly plasticized via the long-chain acrylate unit with formula (1) when the ester compound melts. Moreover, due to the occurrence of the packed structure-mediated interaction also between the resin A and the resin B, the resin B is also plasticized via the packed structure when the resin A melts.

Based on these effects generated by the eutectic structure and the packed structure, a micro-melting chain occurs within the toner particle in the fixing nip and the toner particle as a whole is rapidly plasticized, and due to this an excellent low-temperature fixability is provided.

The toner contains a toner particle that has the ester compound and a binder resin that contains the resin A and the resin B. Each component requirement will be described below.

The Resin A

The resin A contains a monomer unit represented by the following formula (1) and a monomer unit represented by the following formula (2).

(1)

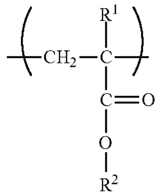

(2)

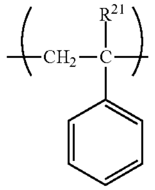

In formula (1), $R^1$ represents a hydrogen atom or methyl group and $R^2$ represents a straight-chain alkyl group having from 10 to 14 carbon atoms. The $R^{21}$ in formula (2) represents a hydrogen atom or methyl group.

The molecular chain of the long-chain acrylate unit represented by formula (1) is highly mobile. As a consequence, the resin containing the long-chain acrylate unit has a high degree of freedom when melted and a lowered viscosity readily occurs. Through the incorporation of the monomer unit represented by formula (1), the eutectic structure with the ester compound can be formed, as described above, and both low-temperature fixability and charging performance in high-temperature, high-humidity environments and in low-temperature, low-humidity environments can be brought about by the mechanisms described above.

Specifically, image fogging is inhibited, even during the performance of a printing durability test in a high-temperature, high-humidity environment; nontransfer fogging is suppressed in low-temperature, low-humidity environments; and an excellent low-temperature fixability is provided. The $R^2$ in formula (1) is a straight-chain alkyl group having preferably 11 to 13 carbon atoms and more preferably 12 carbon atoms. This serves to provide an even better low-temperature fixability and charge stability in high-temperature, high-humidity environments and in low-temperature, low-humidity environments. Specifically, an even better density stability for halftone images can be obtained, even for the execution of a printing durability test in a high-temperature, high-humidity environment, and an even better density stability for solid regions can be obtained when a printing durability test is carried out in a low-temperature, low-humidity environment.

Formula (2) is a monomer unit from styrene or α-methylstyrene. The toner is provided with an excellent charging performance and durability by the incorporation of the monomer unit represented by formula (2). In addition, as described above, a packed structure can be formed between the monomer unit with formula (2) that is present in the resin A and the monomer unit with formula (4) that is present in the resin B. Due to this, charge stability in low-temperature, low-humidity environments and high-temperature, high-humidity environments and low-temperature fixability can both be brought about by the mechanisms described in the preceding.

Specifically, image fogging can be inhibited, even when a printing durability test is carried out in a high-temperature, high-humidity environment; nontransfer fogging can be inhibited in low-temperature, low-humidity environments; and an excellent low-temperature fixability is provided.

The content of the monomer unit represented by formula (1) in the resin A must be from 1.0 mass % to 15.0 mass %. It is preferably from 3.0 mass % to 15.0 mass %. A satisfactory amount of the eutectic structure can be formed by having this content be at least 1.0 mass %. It is preferably at least 3.0 mass % and is more preferably at least 5.0 mass %. On the other hand, the monomer unit represented by formula (1) has a high alkyl chain concentration, and as a consequence there is a tendency to impede the absolute quantity of charge from assuming high values. Due to this, from the standpoint of controlling the charge quantity on the toner, the content of formula (1) is not more than 15.0 mass %. It is preferably not more than 10.0 mass % and more preferably not more than 8.0 mass %.

The content of the monomer unit represented by formula (2) in the resin A must be at least 48.0 mass %. By having the content of the monomer unit represented by formula (2) be in the indicated range, the packed structure with the monomer unit represented by formula (4) in the resin B is then present in a satisfactory amount and assumes a uniformly dispersed state. As a consequence, stabilization of charging in high-temperature, high-humidity environments and in low-temperature, low-humidity environments can be brought about, and low-temperature fixability can also be brought about at the same time. The content of the monomer unit represented by formula (2) is preferably at least 51.0 mass %, more preferably at least 71.0 mass %, and still more preferably at least 75.0 mass %. The upper limit is not particularly limited, but is preferably not more than 95.0 mass %, more preferably not more than 90.0 mass %, and still more preferably not more than 85.0 mass %.

The weight-average molecular weight of the resin A is preferably from 10,000 to 500,000. The weight-average molecular weight can be controlled using, for example, the reaction temperature and the amount of initiator during production of the resin A.

The glass transition temperature of the resin A is preferably from 40° C. to 60° C. The glass transition temperature can be controlled using, for example, the type of units constituting the resin A and their amounts.

With regard to the resin A, a known resin can be used on an optional basis without particular limitation at the same time as the styrene-acrylic resin. Resins that can be used at the same time as the resin A can be exemplified by vinyl resins other than styrene-acrylic resins, polyester resins, polyurethane resins, polyamide resins, and so forth.

The resin A may be obtained by polymerization. Polymerizable monomer that forms the monomer unit with formula (1) in the resin A can be exemplified by acrylate esters and methacrylate esters that have a straight-chain alkyl group having 10 to 14 carbon atoms, e.g., decyl acrylate, decyl methacrylate, lauryl acrylate, lauryl methacrylate, myristyl acrylate, and myristyl methacrylate. The use of lauryl acrylate or lauryl methacrylate among the preceding is preferred.

In addition, the polymerizable monomer that forms the monomer unit with formula (2) in the resin A is styrene or α-methylstyrene. The use of styrene between the two is preferred.

In addition to the monomer unit represented by formula (1) and the monomer unit represented by formula (2), the resin A may have, without particular limitation, a monomer unit provided by another known polymerizable monomer.

Such other polymerizable monomers include monofunctional monomers having one polymerizable unsaturated bond in the molecule, for instance acrylic acid esters such as methyl acrylate and n-butyl acrylate (n-butyl acrylate); methacrylic acid esters such as methyl methacrylate, 2-hydroxyethyl methacrylate, t-butyl methacrylate and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile-based vinyl monomers such as acrylonitrile; halogen-containing vinyl monomers such as vinyl chloride; nitro-based vinyl monomers such as nitrostyrene; as well as multifunctional monomers having a plurality of polymerizable unsaturated bonds in the molecule, such as divinylbenzene, 1,6-hexanediol diacrylate, 1,9-nonanediol diacrylate and trimethylolpropane tri(meth)acrylate.

The use is preferred among the preceding of an alkyl acrylate or alkyl methacrylate having an alkyl group having preferably 1 to 8 (more preferably 1 to 4) carbon atoms, with the use of n-butyl acrylate being more preferred. The content in the resin A of monomer unit from alkyl (meth)acrylate having an alkyl group having 1 to 8 (more preferably 1 to 4) carbon atoms is preferably 0.0 to 45.0 mass % and more preferably 5.0 to 35.0 mass %. The content in the resin A of monomer unit from n-butyl acrylate is preferably 0.0 to 20.0 mass %.

In addition, the resin A preferably has a structure crosslinked by divinylbenzene. The content in the resin A of the constituent component due to divinylbenzene is preferably 0.1 to 2.0 mass % and is more preferably 0.5 to 1.5 mass %.

The content of the monomer unit represented by formula (3) in the resin A is preferably less than 1.0 mass %, more preferably not more than 0.5 mass %, and still more preferably not more than 0.1 mass % and is even more preferably 0.0 mass %.

By having the content in the resin A of the unit with formula (3) be less than 1.0 mass %, aggregation between the monomer unit with formula (3) present in the resin A and the monomer unit with formula (3) possessed by the resin B can be inhibited and the generation of local charge inhomogeneities is impeded. Since, due to this, unevenness in the charging performance in low-temperature, low-humidity environments can be suppressed in particular, the density uniformity in solid images after a printing durability test is raised still further.

The Resin B

The toner particle contains the resin B. The resin B contains a monomer unit represented by the following formula (3) and a monomer unit represented by the following formula (4).

(3)

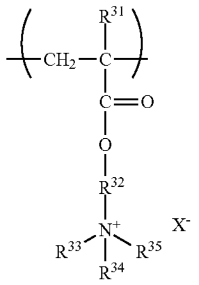

(4)

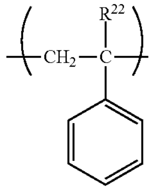

In formula (3), $R^{31}$ represents a hydrogen atom or methyl group; $R^{32}$ represents a optionally halogen-substituted straight-chain or branched alkylene group having 1 to 3 carbon atoms (preferably 1 or 2 carbon atoms and more preferably 2 carbon atoms); $R^{33}$ to $R^{35}$ each independently represent a benzyl group, phenethyl group, or straight-chain, branched, or cyclic alkyl group having 1 to 6 carbon atoms (preferably 1 to 3 carbon atoms, more preferably 1 or 2 carbon atoms, and still more preferably 1 carbon atom); and X represents a counteranion. The counterion can be exemplified by $Cl^-$ and $OH^-$ with being preferred. Preferably one of $R^{33}$ to $R^{35}$ is the benzyl group and the other two are a straight-chain or branched alkyl group having 1 to 6 carbon atoms (preferably 1 to 3 carbon atoms, more preferably 1 or 2 carbon atoms, and still more preferably 1 carbon). $R^{22}$ in formula (4) represents a hydrogen atom or methyl group.

The monomer unit represented by formula (3) contains a quaternary ammonium salt group and is required in order to bring about the occurrence of a positive charging performance. The toner has a positive charging performance due to the resin B having the monomer unit represented by formula (3).

The content of the monomer unit represented by formula (3) in the resin B is preferably 0.2 to 8.0 mass %, more preferably 0.5 to 6.0 mass %, and still more preferably 0.8 to 5.5 mass %.

The monomer unit represented by formula (4) is a monomer unit provided by styrene or α-methylstyrene. A eutectic structure is formed as described above by the ester compound and the long-chain acrylate unit with formula (1), and a packed structure is formed by π-π interaction between the formula (2) in the resin A and the formula (4) in the resin B. As a consequence of this, stabilization of charging can be brought about in high-temperature, high-humidity environments and in low-temperature, low-humidity environments, and low-temperature fixability can also be brought about at the same time. Specifically, image fogging can be inhibited, even when a printing durability test is run in a high-temperature, high-humidity environment; nontransfer fogging can be inhibited in low-temperature, low-humidity environments; and an excellent low-temperature fixability is provided.

The content of the monomer unit represented by formula (4) in the resin B must be at least 48.0 mass %. By having the content of the monomer unit represented by formula (4) be in the indicated range, the packed structure with the unit with formula (2) in the resin A is then present in a satisfactory amount and assumes a uniformly dispersed state. As a consequence, stabilization of charging in high-temperature, high-humidity environments and in low-temperature, low-humidity environments can be brought about, and low-temperature fixability can also be brought about at the same time. The content of the monomer unit represented by formula (4) is preferably at least 51.0 mass %, more preferably at least 71.0 mass %, and still more preferably at least 75.0 mass %. The upper limit is not particularly limited, but is preferably not more than 95.0 mass %, more preferably not more than 90.0 mass %, and still more preferably not more than 85.0 mass %.

In addition to the monomer unit represented by formula (3) and the monomer unit represented by formula (4), the resin B may have, without particular limitation, a monomer unit provided by another known polymerizable monomer. The polymerizable monomers already described above can be used as this additional polymerizable monomer.

The use is preferred among the preceding of an alkyl acrylate or alkyl methacrylate having an alkyl group having preferably 1 to 8 (more preferably 1 to 4) carbon atoms, with the use of n-butyl acrylate being more preferred. The content in the resin B of monomer unit from alkyl (meth)acrylate having an alkyl group having 1 to 8 (more preferably 1 to 4) carbon atoms is preferably 0.0 to 48.0 mass % and more preferably 5.0 to 30.0 mass %. The content in the resin B of monomer unit from n-butyl acrylate is preferably 0.0 to 20.0 mass %.

The content of the monomer unit represented by formula (1) in the resin B is preferably less than 1.0 mass %, more preferably not more than 0.5 mass %, and still more preferably not more than 0.1 mass % and is even more preferably 0.0 mass %. Having the content of the monomer unit with formula (1) be in the indicated range makes it possible to bring about the stable occurrence in the vicinity of the monomer unit represented by formula (3) in the resin B, of the eutectic structure formed by the ester compound and the monomer unit represented by formula (1) present in the resin A. As a consequence, the moisture adsorption-inhibiting effect due to the eutectic structure is increased and the density uniformity of halftone images after a printing durability test in a high-temperature, high-humidity environment is increased.

The Ester Compound

The toner particle contains at least one ester compound selected from the group consisting of ester compounds represented by the following formula (5), ester compounds represented by the following formula (6), and ester compounds represented by the following formula (7).

(5)

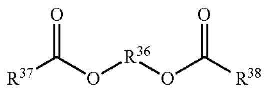

(6)

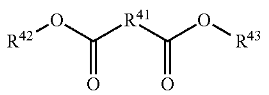

(7)

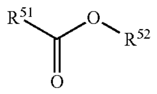

In formulas (5), (6), and (7), $R^{36}$ and $R^{41}$ represent alkylene groups having from 2 to 8 carbon atoms, and $R^{37}$, $R^{38}$, $R^{42}$, $R^{43}$, $R^{51}$, and $R^{52}$ each independently represent a straight-chain alkyl group having from 14 to 24 (preferably from 16 to 24 and more preferably from 17 to 22) carbon atoms. The ester compounds with formulas (5) to (7) exhibit a high affinity with the monomer unit with formula (1) in the resin A, and as a consequence readily increase the compatibility during melting and can provide an excellent low-temperature fixability.

In addition, the eutectic structure described above can be formed due to the high structural similarity between the long-chain acrylate unit with formula (1) and the ester compound selected from formulas (5) to (7). Moreover, the charge stability in high-temperature, high-humidity environments and in low-temperature, low-humidity environments is raised by the presence of the above-described packed structure between formula (2) of the resin A and formula (4) of the resin B. Specifically, image fogging can be inhibited, even when a printing durability test is run in a high-temperature, high-humidity environment; nontransfer fogging can be inhibited in low-temperature, low-humidity environments; and an excellent low-temperature fixability is provided.

Examples of the compound represented by Formula (5) include ethylene glycol dipalmitate, ethylene glycol distearate, ethylene glycol dieicosanate, ethylene glycol dibehenate, ethylene glycol ditetracosanate, butanediol distearate, butanediol dibehenate, hexanediol distearate, hexanediol dibehenate, octanediol distearate and octanediol dibehenate.

Examples of the compound represented by Formula (6) include distearyl succinate, dibehenyl succinate, distearyl adipate, dibehenyl adipate, distearyl suberate, dibehenyl suberate, distearyl sebacate and dibehenyl sebacate.

Examples of the compound represented by Formula (7) include palmityl palmitate, stearyl palmitate, behenyl palmitate, palmityl stearate, stearyl stearate, behenyl stearate, palmityl behenate, stearyl behenate and behenyl behenate.

Among these ester compounds, at least one selection from the group consisting of ethylene glycol distearate, ethylene glycol dibehenate, dibehenyl sebacate, stearyl behenate, behenyl behenate, and behenyl stearate is preferred for the ester compound from the standpoint of the melting point and molecular weight being in the preferred ranges described below and from the standpoint of facilitating formation of the eutectic structure with the unit with formula (1).

The melting point of the ester compound is preferably from 60° C. to 90° C. and more preferably from 65° C. to 85° C. The molecular weight of the ester compound is preferably from 500 to 900 and more preferably from 550 to 850.

The content of the ester compound is preferably from 1.0 parts by mass to 40.0 parts by mass, more preferably from 3.0 parts by mass to 30.0 parts by mass, and yet more preferably from 5.0 parts by mass to 25.0 parts by mass, relative to 100.0 parts by mass of the binder resin.

Content of the Resin A in the Chloroform-Soluble Matter

Due to the aforementioned eutectic structure and π-π interaction-based packed structure, the toner exhibits an excellent charging stability in high-temperature, high-humidity environments and low-temperature, low-humidity environments, and at the same time can also exhibit low-temperature fixability. As a consequence, the content of the resin A in the chloroform-soluble matter, the content of the monomer unit with formula (1) in the resin A, the content of the monomer unit with formula (2) in the resin A, and the content of the monomer with formula (4) in the resin B are controlled.

Specifically, the content of the resin A in the chloroform-soluble matter of the toner particle must be at least 60 mass %. By having the resin A content be at least 60 mass %, the eutectic structure constituted of the ester compound and monomer unit with formula (1) is then present in the toner in a satisfactory amount and assumes a uniformly dispersed state. As a consequence, stabilization of charging in high-temperature, high-humidity environments and in low-temperature, low-humidity environments can be brought about, and low-temperature fixability can also be brought about at the same time. The resin A content in the chloroform-soluble matter of the toner particle is more preferably at least 70 mass %. The upper limit is not particularly limited, but is preferably less than or equal to 100 mass %, more preferably less than or equal to 99 mass %, and still more preferably less than or equal to 98 mass %.

The content of the resin A in the chloroform-soluble matter of the toner particle is preferably controlled by controlling the blending amounts for the resin A and the resin B in the toner production process. In addition, from the standpoint of having the low-temperature fixability coexist with the charge stability in high-temperature, high-humidity environments and low-temperature, low-humidity environments, the range of resin A:resin B=60:40 to 99.9:0.1 is preferred for the blending ratio (mass basis) between the resin A and the resin B in the chloroform-soluble matter. Resin A:resin B=80:20 to 99.7:0.3 is more preferred and resin A:resin B=90:10 to 99.5:0.5 is still more preferred.

The resin A content in the binder resin is preferably 60.0 to 99.5 mass %, more preferably 80.0 to 99.0 mass %, and still more preferably 90.0 to 98.0 mass %.

The resin B content in the binder resin is preferably 0.5 to 40.0 mass %, more preferably 1.0 to 30.0 mass %, and still more preferably 1.5 to 10.0 mass %.

The SP Value

Using SPm $(J/cm^3)^{1/2}$ for the SP value of the monomer unit represented by formula (1) and using SPw $(J/cm^3)^{1/2}$ for the SP value of the ester compound, SPm must be from 18.00 to 19.00 and SPm and SPw must satisfy the following formula (a).

$$|SPm-SPw|\leq 1.50 \quad (a)$$

A suitably high polarity is provided for the monomer unit by having SPm be at least 18.00, and as a consequence the charging performance in high-temperature, high-humidity environments is maintained at high levels and fogging after durability testing and standing can be inhibited. By having SPm be not more than 19.00, the polarity of the monomer unit is then not too high, and as a consequence charge up in low-temperature, low-humidity environments is suppressed and nontransfer fogging can be suppressed. SPm is preferably 18.50 to 18.90.

SPw is preferably 17.00 to 18.50 and more preferably 17.40 to 18.20.

Having |SPm−SPw| be less than or equal to 1.50 provides a high affinity between the monomer unit with formula (1) and the ester compound, and as a consequence the eutectic structure can be formed as described above by the monomer unit with formula (1) and the ester compound. This then provides an excellent charge stability in high-temperature, high-humidity environments. |SPm−SPw| is preferably not more than 1.30 and more preferably not more than 1.20. The lower limit is not particularly limited, but is preferably greater than or equal to 0.00, or greater than or equal to 0.30, or greater than or equal to 0.50.

SPw, which is the SP value of the ester compound, is determined after Fedors. SPm, which is the SP value of the monomer unit, is determined, proceeding as described below, in accordance with the calculation procedure proposed by Fedors.

Here, when the resin A is a vinyl resin (when the polymer constituting this resin is produced by the polymerization reaction of vinyl monomer), the monomer unit constituting the resin A refers to the molecular structure in a state in which the double bond of the vinyl monomer has been opened by polymerization.

For example, to calculate the SP value (SPm) $(J/cm^3)^{1/2}$ of the monomer unit, the vaporization energy (Δei) (J/mol) and molar volume (Δvi) ($cm^3$/mol) of the atoms and atomic groups in the molecular structure of this monomer unit are determined from the tables provided in "Polym. Eng. Sci., 14(2), 147-154 (1974)", and the calculation is performed using the following formula.

$$SPm=(\Sigma\Delta ei/\Sigma\Delta vi)^{1/2}$$

The unit for the SP value is $(J/cm^3)^{1/2}$, but this can be converted to the $(cal/cm^3)^{1/2}$ unit using 1 $(cal/cm^3)^{1/2}=2.046\times10^{-3}$ $(J/cm^3)^{1/2}$.

The Sulfide Group

The resin A preferably has at least one selected from the group consisting of the sulfide group and disulfide group. The structure of the sulfide group is given by R—S—R', and this is a structure in which the oxygen of an ether has been replaced by sulfur. The sulfide group and disulfide group have unpaired electrons and because of this have an excellent charge transfer performance. By incorporating a sulfide group or disulfide group in the resin A, the charge transfer performance in the resin A and the charge transfer performance between the resin A and the resin B can be further promoted and the charging uniformity of the toner is further enhanced.

The effect of this is to enable an additional suppression of charge up in low-temperature, low-humidity environments and to also enable an additional suppression, post-printing durability testing, of nontransfer fogging and density fluctuations in solid images. Moreover, because the charging uniformity of the toner is also enhanced, passage through the fixing nip during transfer onto paper can be brought about in a state in which there is a high electrostatic attachment force to the paper and the low-temperature fixability of the toner can be further enhanced. This is preferred in particular because it can further enhance toner adherence to talc paper.

The means for introducing the sulfide group into the resin A is preferably, for example, the addition of a compound as follows: a mercaptan such as t-dodecyl mercaptan, n-dodecyl mercaptan, or n-octyl mercaptan, or a disulfide such as tetraethylthiuram disulfide. The resin A preferably has a sulfide group or disulfide group as provided by at least one selected from the group consisting of the aforementioned mercaptans and disulfides. The resin A more preferably has a disulfide group as provided by tetraethylthiuram disulfide. The resin A contains preferably 0.2 mass % to 2.6 mass % and more preferably 0.4 mass % to 1.6 mass % of constituent component from the aforementioned mercaptans and disulfides.

The Monomer Unit with Formula (8)

The resin A preferably also has a monomer unit represented by the following formula (8).

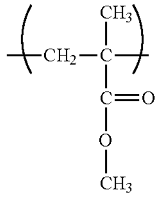

(8)

The positive charging performance of the toner is further increased by the incorporation of the monomer unit with formula (8) in the resin A. As a consequence, image fogging in high-temperature, high-humidity environments can be further suppressed and nontransfer fogging in durability testing in low-temperature, low-humidity environments can be further suppressed. Since a more advantageous action on the charge rise performance occurs as the monomer unit with formula (8) more readily occurs in the vicinity of the toner particle surface, the addition of the monomer that forms the monomer unit with formula (8) in the latter half of the toner production process is also preferred, although there is no particular limitation to this.

The content of the monomer unit with formula (8) in the resin A is preferably 0.0 to 35.0 mass %, more preferably 0.2 to 5.0 mass %, and still more preferably 0.5 to 2.0 mass %.

The Loss Elastic Modulus G"

The loss elastic modulus G" of the toner at 100° C. in dynamic viscoelastic measurement of the toner is preferably not more than $3.0\times10^5$ ($dyn/cm^2$). Not more than $7.0\times10^4$ ($dyn/cm^2$) is more preferred. An even better low-temperature fixability is provided in this range. By having the loss elastic modulus at 100° C. be in the indicated range, the flowability of the melted toner in the fixing nip is raised and the toner is then deformed and fixed in conformity to unevenness in the paper, as a consequence of which the adherence to the paper is raised still further, and this is thus preferred. The lower limit on this loss elastic modulus is not particularly limited, but is preferably greater than or equal to $2.0\times10^4$ ($dyn/cm^2$) and is more preferably greater than or equal to $4.0\times10^4$ ($dyn/cm^2$).

Control of the loss elastic modulus G" of the toner at 100° C. can be largely divided into control of the binder resin and control of the ester compound. With regard to the binder resin, the loss elastic modulus G" can be controlled by adjusting the molecular weight and by changing the molecular weight modifier content, the type and content of the monomer with formula (1), the amounts of the resin A and the resin B, and the material type of the monomer constituting the binder resin. The loss elastic modulus G" can be controlled through the content of the ester compound in the toner and the type of the ester compound.

The Average Circularity of the Toner

The average circularity of the toner is preferably from 0.94 to 0.99. From the standpoint of bringing about additional improvements in the transferability, the average circularity of the toner is more preferably from 0.97 to 0.99.

In the particular case of use of rough paper that presents a large unevenness, non-uniformity in toner transferability is produced between the depressed portions and protruded portions of the paper and a satisfactory toner transfer at the depressed portions of the paper cannot be brought about and density non-uniformity may be produced in solid images. By having the average circularity of the toner be at least 0.97, the transferability can be further improved and more uniform solid images are obtained even in the latter half of a printing durability test.

On the other hand, by having the average circularity be not more than 0.99, transfer scattering with dot images can be suppressed and the uniformity of halftone images is raised. The method for measuring the average circularity of the toner is described below.

The Average Long Diameter r1 of the Domains

In observation of the cross section of the toner using a scanning transmission electron microscope, preferably domains of the ester compound are present in the toner cross section, the average number of these domains in the toner cross section is at least 100, and r1 is not more than 1.00 μm where r1 (μm) is the average long diameter of the domains.

The average number of domains is more preferably at least 130, still more preferably at least 150, and particularly preferably at least 200, and is best at least 250. The upper limit, on the other hand, is not particularly limited, but is preferably not more than 10,000, more preferably not more than 5,000, still more preferably not more than 1,000, and even more preferably not more than 600.

In addition, the average long diameter r1 is more preferably not more than 0.50 μm, still more preferably not more than 0.3 μm, and particularly preferably not more than 0.20 μm, and is best not more than 0.10 μm. On the other hand, the lower limit is not particularly limited, but is preferably at least 0.001 μm.

An r1 of not more than 1.00 μm means that the ester compound in the toner particle has been microfine-sized, and the eutectic structure formed as described above by the monomer unit with formula (1) and the ester compound then assumes a state in which a more uniform dispersion in the toner particle is facilitated. An increase in the charge uniformity in the toner particle is thus facilitated, and, in the particular case of use of rough paper that presents a large unevenness, the transferability of the toner can be further enhanced and more uniform solid images are readily obtained—even in the latter half of printing durability testing.

In order to bring r1 into the indicated range, preferably the type and content of the monomer with formula (1) in the resin A and the ester compound content are brought into suitable ranges and preferably the rapid cooling rate and/or annealing conditions in the toner production method are brought into suitable ranges.

The Surface Nitrogen Quantity Index

In measurement of the toner using x-ray photoelectron spectroscopic analysis (ESCA), the surface nitrogen quantity index, this being the amount of occurrence of N (nitrogen atom) with reference to the total of the C (carbon atom), N (nitrogen atom), 0 (oxygen atom), and Si (silicon atom), is from 0.2 atomic % to 5.0 atomic %. This is more preferably from 0.4 atomic % to 2.0 atomic % and is still more preferably from 0.6 atomic % to 1.5 atomic %.

Having the surface nitrogen quantity index be at least 0.2 atomic % can bring about a stabilization of the charge quantity on the toner in high-temperature, high-humidity environments, and as a consequence an even better density stability for halftone images is provided even in printing durability tests. On the other hand, having the surface nitrogen quantity index be not more than 5.0 atomic % can bring about a stabilization of the charge quantity on the toner in low-temperature, low-humidity environments, which facilitates obtaining more uniform solid images even in printing durability tests.

The surface nitrogen quantity index can be controlled proceeding as follows.

The surface nitrogen quantity index can be increased by increasing the amount of occurrence in the vicinity of the toner surface of the monomer unit with formula (3) in the resin B. Because the monomer unit with formula (3) is a unit with a high polarity, the surface nitrogen quantity is readily raised by using a suspension polymerization method, which produces the toner in an aqueous medium. Adjustment can also be carried out by adjusting the resin B content into the preferred range.

When a suspension polymerization method is used, the surface nitrogen quantity can also be adjusted by adjusting the interaction between the resin A and the resin B.

Specific examples in this regard are adjustment into the preferred ranges of the type and content of the monomer unit represented by formula (1) in the resin A, and the incorporation in the resin A of at least one selection from the group consisting of the sulfide group and the disulfide group. By doing this, both the main chain and the terminals of the resin A assume a suitable hydrophobicity and orientation to the vicinity of the toner surface by the monomer unit with formula (3) present in the resin B is then facilitated and the surface nitrogen quantity assumes an increasing trend.

Release Agent

The toner particle may contain, as a release agent, a known wax other than the ester compound that has been specified in the preceding.

The release agent can be exemplified by petroleum waxes as represented by paraffin waxes, microcrystalline waxes, and petrolatum, and derivatives thereof; montan wax and derivatives thereof; hydrocarbon waxes provided by the Fischer-Tropsch method, and derivatives thereof; polyolefin waxes as represented by polyethylene, and derivatives thereof; and natural waxes as represented by carnauba wax and candelilla wax, and derivatives thereof. These derivatives also include oxides and block copolymers and graft modifications with vinyl monomer. A single one of these by itself or combinations of these may be used.

The content of the non-ester-compound release agent, per 100 mass parts of the binder resin, is preferably 0.1 to 20 mass parts and more preferably 1 to 10 mass parts.

Colorant

The toner particle may contain a colorant. The known magnetic bodies and pigments and dyes in the colors of black, yellow, magenta, and cyan as well as in other colors may be used without particular limitation as the colorant.

The black colorant can be exemplified by black pigments such as carbon black.

The yellow colorant can be exemplified by yellow pigments and yellow dyes, e.g., monoazo compounds, disazo compounds, condensed azo compounds, isoindolinone compounds, benzimidazolone compounds, anthraquinone compounds, azo metal complexes, methine compounds, and allylamide compounds.

Specific examples are C. I. Pigment Yellow 74, 93, 95, 109, 111, 128, 155, 174, 180, and 185 and C. I. Solvent Yellow 162.

The magenta colorants can be exemplified by magenta pigments and magenta dyes, e.g., monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples are C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, and C. I. Pigment Violet 19.

The cyan colorants can be exemplified by cyan pigments and cyan dyes, e.g., copper phthalocyanine compounds and derivatives thereof, anthraquinone compounds, and basic dye lake compounds.

Specific examples are C. I. Pigment Blue 1, 7, 15, 15:1, 15:2, 15:3, 15:4, 60, 62, and 66.

The colorant content, considered per 100.0 mass parts of the binder resin or polymerizable monomer, is preferably from 1.0 mass parts to 20.0 mass parts.

In addition, the toner may also be made into a magnetic toner through the incorporation of a magnetic material. In this case, the magnetic material may also function as a colorant.

The magnetic material can be exemplified by iron oxides as represented by magnetite, hematite, and ferrite; metals as represented by iron, cobalt, and nickel; alloys of these metals with a metal such as aluminum, cobalt, copper, lead, magnesium, tin, zinc, antimony, beryllium, bismuth, cadmium, calcium, manganese, selenium, titanium, tungsten, and vanadium; and mixtures thereof.

When a magnetic material is used as the colorant, the magnetic material content is preferably from 30.0 mass parts to 100.0 mass parts per 100.0 mass parts of the binder resin.

Additional Charge Control Agents

The toner contains the resin B as a positive charge control agent. The toner may contain an additional charge control agent within a range in which the effects described in the preceding are not lost. There are no particular limitations on the additional charge control agent that can be incorporated, and a known charge control agent can be used.

For example, negative charge control agents can be exemplified by metal compounds of aromatic carboxylic acids such as salicylic acid, alkylsalicylic acids, dialkylsalicylic acids, naphthoic acid, and dicarboxylic acids, and polymers and copolymers that have this metal compound of an aromatic carboxylic acid; polymers and copolymers that have a sulfonic acid group, sulfonate salt group, or sulfonate ester group; metal salts and metal complexes of azo dyes and azo pigments; boron compounds; silicon compounds; and calixarene.

The positive charge control agents, on the other hand, can be exemplified by quaternary ammonium salts and polymeric compounds that have a quaternary ammonium salt in side chain position; guanidine compounds; nigrosine compounds; and imidazole compounds. The polymers and copolymers that have a sulfonate salt group or sulfonate ester group can be exemplified by homopolymers of a sulfonic acid group-containing vinyl monomer such as styrenesulfonic acid, 2-acrylamido-2-methylpropanesulfonic acid, 2-methacrylamido-2-methylpropanesulfonic acid, vinylsulfonic acid, and methacrylsulfonic acid, and by copolymers of sulfonic acid group-containing vinyl monomers with vinyl monomer as described in the section on the binder resin.

The additional charge control agent content, considered per 100.0 mass parts of the resin A, is preferably from 0.01 mass parts to 5.0 mass parts.

External Additives

The toner may contain an external additive.

Examples of the external additive include starting silica fine particles such as wet-produced silica or dry-produced silica, or surface-treated silica fine particles resulting from subjecting the foregoing starting silica fine particles to a surface treatment using a treating agent such as a silane coupling agent, a titanium coupling agent or silicone oil; metal oxide fine particles typified by titanium oxide fine particles, aluminum oxide fine particles, zinc oxide fine particles, tin oxide fine particles, and metal oxide fine particles having undergone a hydrophobic treatment; metal salts of fatty acid, typified by zinc stearate, calcium stearate and zinc stearate; metal complexes of aromatic carboxylic acids, typified by salicylic acid, alkyl salicylic acid, dialkyl salicylic acid, naphthoic acid and dicarboxylic acids; clay minerals typified by hydrotalcite; fluorine-based resin fine particles typified by vinylidene fluoride fine particles and polytetrafluoroethylene fine particles; inorganic fine particles such as calcium carbonate, calcium phosphate and cerium oxide; as well as organic fine particles of polymethyl methacrylate resin, silicone resins and melamine resin.

Viewed from the standpoints of the flowability and charge stability, the use is preferred of silica fine particles provided by the treatment of starting silica fine particles with a silicone oil.

The content of the external additive in the toner is preferably from 0.1 mass parts to 5.0 mass parts per 100 mass parts of the toner particle.

Toner Particle Production

Know means can be used for the toner particle production method, and a kneading/pulverization method or a wet production method can be used. A wet production method is preferably used from the standpoints of the ability to control the shape and achieving a uniform particle size. Wet production methods can be exemplified by the suspension polymerization method, dissolution suspension method, and emulsion aggregation method, wherein the use of the suspension polymerization method is preferred from the standpoint of facilitating the formation of the eutectic structure between the ester compound and the monomer unit with formula (1).

The suspension polymerization method is described in the following.

In the suspension polymerization method, a polymerizable monomer composition is obtained by uniformly dissolving or dispersing the ester compound, the resin B, and polymerizable monomer that will form the resin A (and optionally a colorant, polymerization initiator, crosslinking agent, charge control agent, and other additives). A polymerization reaction is then run while at the same time dispersing this polymerizable monomer composition, using a suitable stirrer, in a continuous phase (for example, an aqueous phase) that contains a dispersing agent, to obtain a toner particle having the desired particle diameter. The toner particle provided by this suspension polymerization method (also referred to hereafter as the "polymerized toner particle") has an individual toner particle shape uniformly brought to an approximately spherical shape, and due to this the charge quantity distribution is also made relatively uniform and an improvement in the image quantity can then be expected.

Examples of the polymerizable monomer that constitutes the polymerizable monomer composition in the production of the polymerized toner particle are given in the following.

A monovinyl monomer is preferably used for the polymerizable monomer. The monovinyl monomer can be exemplified by styrene; styrene derivatives, e.g., vinyltoluene and $\alpha$-methylstyrene; acrylic acid and methacrylic acid; acrylate esters, e.g., methyl acrylate, ethyl acrylate, propyl acrylate, butyl acrylate, 2-ethylhexyl acrylate, and dimethylaminoethyl acrylate; methacrylate esters such as methyl methacrylate, ethyl methacrylate, propyl methacrylate, butyl methacrylate, 2-ethylhexyl methacrylate, and dimethylaminoethyl methacrylate; nitrile compounds, e.g., acrylonitrile and methacrylonitrile; amide compounds, e.g., acrylamide and methacrylamide; and olefins, e.g., ethylene, propylene, and butylene.

Among the preceding, preferably at least one selected from the group consisting of styrene, styrene derivatives, acrylate esters, and methacrylate esters is included as the monovinyl monomer. The monovinyl monomer more preferably contains at least one selected from the group consisting of styrene and styrene derivatives and at least one selected from the group consisting of acrylate esters and methacrylate esters.

Each of these monovinyl monomers may be used by itself or a combination of two or more may be used.

The polymerizable monomer preferably contains monovinyl monomer as its main component. Specifically, the monovinyl monomer content in the polymerizable monomer is preferably from 50 mass % to 100 mass %.

The polymerization initiator used in toner particle production by a polymerization method can be exemplified by persulfate salts, e.g., potassium persulfate and ammonium persulfate; azo compounds, e.g., 4,4'-azobis(4-cyanovaleric acid), 2,2'-azobis(2-methyl-N-(2-hydroxyethyl)propionamide), 2,2'-azobis(2-amidinopropane) dihydrochloride, 2,2'-azobis(2,4-dimethylvaleronitrile), and 2,2'-azobisisobutyronitrile; and organoperoxides, e.g., di-t-butyl peroxide, benzoyl peroxide, t-butyl peroxy-2-ethylhexanoate, t-butyl peroxydiethylacetate, t-hexyl peroxy-2-ethylbutanoate, diisopropyl peroxydicarbonate, di-t-butyl peroxyisophthalate, and t-butyl peroxyisobutyrate. A single one of these may be used by itself, or a combination of two or more may be used. Among the preceding, the use of organoperoxide is preferred because this makes it possible to minimize residual polymerizable monomer and to also provide an excellent printing durability.

Among the organoperoxides, peroxyesters are preferred because they provide a good initiation efficiency and because they also make it possible to minimize residual polymerizable monomer; nonaromatic peroxyesters, i.e., peroxyesters lacking an aromatic ring, are more preferred.

The polymerization initiator may be added prior to liquid droplet formation after dispersion of the polymerizable monomer composition in an aqueous medium, supra, or may be added to the polymerizable monomer composition prior to dispersion in the aqueous medium.

The amount of addition of the polymerization initiator used for polymerization of the polymerizable monomer composition, per 100 mass parts of the polymerizable monomer, is preferably from 0.1 mass parts to 20 mass parts, more preferably from 0.3 mass parts to 15 mass parts, and particularly preferably from 1 mass parts to 10 mass parts.

A crosslinking agent may be added to toner particle production by a polymerization method. The preferred amount of crosslinking agent addition is from 0.001 mass parts to 15 mass parts per 100 mass parts of the polymerizable monomer.

Compounds having two or more polymerizable double bonds are mainly used as the crosslinking agent. Specific examples are aromatic divinyl compounds, e.g., divinylbenzene and divinylnaphthalene and their derivatives; ester compounds in which two or more carboxylic acids having a carbon-carbon double bond, are ester-bonded to an alcohol having two or more hydroxyl groups, e.g., ethylene glycol dimethacrylate and diethylene glycol dimethacrylate; other divinyl compounds, e.g., N,N-divinylaniline and divinyl ether; and compounds having three or more vinyl groups.

A single one of these crosslinking agents may be used by itself, or a combination of two or more may be used.

A molecular weight modifier is preferably used, as an additional additive, during the polymerization of the polymerizable monomer that will form the binder resin by polymerization.

The molecular weight modifier should be a molecular weight modifier as generally used for toners, but is not otherwise particularly limited; however, molecular weight modifiers that have a sulfide group and/or disulfide group are preferred. Examples are mercaptans such as t-dodecyl mercaptan, n-dodecyl mercaptan, n-octyl mercaptan, and 2,2,4,6,6-pentamethylheptane-4-thiol, and thiuram disulfides such as tetramethylthiuram disulfide, tetraethylthiuram disulfide, tetrabutylthiuram disulfide, N,N'-dimethyl-N,N'-diphenylthiuram disulfide, and N,N'-dioctadecyl-N,N'-diisopropylthiuram disulfide. A single one of these molecular weight modifiers may be used by itself, or two or more may be used in combination.

The molecular weight modifier is used in a proportion, per 100 mass parts of the polymerizable monomer, of preferably from 0.01 mass parts to 10 mass parts and more preferably from 0.1 mass parts to 5 mass parts.

In toner particle production by a polymerization method, generally the starting materials for the toner particle, supra, are suitably combined; a polymerizable monomer composition is prepared by dissolution or dispersion to uniformity using a disperser, e.g., a homogenizer, ball mill, or ultrasound disperser; and this polymerizable monomer composition is suspended in an aqueous medium that contains a dispersing agent. During this process, a sharper particle diameter may be established for the resulting toner particle when the size desired for the toner particle is immediately established using a high-speed disperser such as a high-speed stirrer or ultrasound disperser.

With regard to the timing of polymerization initiator addition, the polymerization initiator may be added at the same time as the addition of the other additives to the polymerizable monomer or may be admixed immediately before suspension in the aqueous medium. The polymerization initiator dissolved in the polymerizable monomer or solvent may also be added immediately after granulation and before the start of the polymerization reaction.

Granulation may be followed by stirring, using an ordinary stirrer, to a degree sufficient to maintain the particulate state and prevent particle flotation and sedimentation.

A known surfactant, organic dispersing agent, or inorganic dispersing agent can be used as a dispersing agent during toner particle production. Among these, the use is preferred of inorganic dispersing agents for the following reasons: because they provide dispersion stability through steric hindrance, they resist disruptions in stability even when the reaction temperature is changed; and they are unlikely to exercise negative effects on the toner because they are also easily washed out. Such inorganic dispersing agents can be exemplified by sulfate salts, e.g., barium sulfate and calcium sulfate; carbonate salts, e.g., barium carbonate, calcium carbonate, and magnesium carbonate; phosphate salts, e.g., calcium phosphate; metal oxides, e.g., aluminum oxide and titanium oxide; and metal hydroxides, e.g., aluminum hydroxide, magnesium hydroxide, sodium hydroxide, and ferric hydroxide.

These inorganic dispersing agents are preferably used at from 0.2 mass parts to 20 mass parts per 100 mass parts of the polymerizable monomer. A single such dispersing agent may be used by itself or a plurality may be used in combination. In addition, from 0.001 mass parts to 0.1 mass parts of a surfactant may be co-used.

The polymerization temperature in the step of polymerizing the polymerizable monomer is preferably at least 50° C. and is more preferably from 60° C. to 95° C. The reaction time for the polymerization is preferably from 1 hour to 20 hours and is more preferably from 2 hours to 15 hours.

The toner particle is preferably a core-shell type (alternatively also referred to as a "capsule type") toner particle, having a binder resin-containing core particle and a shell (preferably different from the core particle) on the surface of the core particle. Through the coating of the core particle comprising material having a low softening point, with material having a higher softening point, the core-shell type toner particle can provide balance between stopping aggregation during storage and reducing the fixation temperature.

The shell need not cover the entire core particle, and the core particle may be exposed at the toner particle surface.

There are no particular limitations on the method for producing this core-shell type toner particle using the aforementioned polymer particle, and production can be carried out using heretofore known methods. Among these, the in situ polymerization method and the phase separation method are preferred in terms of production efficiency.

Production of a core-shell type toner particle by in situ polymerization is described in the following.

A core-shell type polymer particle can be obtained by adding, to an aqueous medium in which core particles are dispersed, polymerizable monomer for forming the shell (shell polymerizable monomer) and a polymerization initiator and carrying out polymerization.

The same polymerizable monomers that have been described above may be used as the shell polymerizable monomer. Among these, the use is preferred of monomer that yields polymer having a glass transition temperature (Tg) in excess of 80° C., e.g., styrene, acrylonitrile, methyl methacrylate, and so forth, and a single such monomer can be used or a combination of two or more can be used. Among these, the use of at least methyl methacrylate as the shell polymerizable monomer is preferred.

The shell preferably contains a polymer of alkyl (meth) acrylate ester. The alkyl (meth)acrylate ester is preferably at least one alkyl (meth)acrylate ester selected from the group consisting of alkyl (meth)acrylate esters having an alkyl group having 1 to 4 (more preferably 1 or 2) carbon atoms. An alkyl (meth)acrylate ester having an alkyl group having 1 to 4 carbon atoms is an ester between (meth)acrylic acid and an alcohol having 1 to 4 carbon atoms. The shell more preferably contains a methyl methacrylate polymer. That is, the shell more preferably has the monomer unit given by the aforementioned formula (8). The proportion of the shell in the toner particle is preferably 0.1 to 2.0 mass % and is more preferably 0.5 to 1.5 mass %.

The polymerization initiator used for polymerization of the shell polymerizable monomer can be exemplified by water-soluble polymerization initiators, e.g., metal persulfate salts such as potassium persulfate and ammonium persulfate, and azo initiators such as 2,2'-azobis(2-methyl-N-(2-hydroxyethyl)propionamide), 2,2'-azobis(2-methyl-N-(1,1-bis(hydroxymethyl)-2-hydroxyethyl)propionamide), 2,2'-azobis[N-(2-carboxyethyl)-2-methylpropionamidine], or their hydrates. A single one of these may be used by itself, or a combination of two or more may be used. The amount of the polymerization initiator, per 100 mass parts of the shell polymerizable monomer, is preferably from 0.1 to 30 mass parts and more preferably from 1 to 20 mass parts.

When the phase separation method is used, a polymer—provided by the preliminary polymerization of shell-forming material—is preferably added to polymerizable monomer for forming the core. When a pre-polymerized polymer is used, it is more preferably a reactive polymer having an unsaturated bond.

The polymerization temperature for the shell is preferably at least 50° C. and more preferably from 60° C. to 95° C. The reaction time for the polymerization is preferably from 1 hour to 20 hours and is more preferably from 2 hours to 15 hours.

The toner particle can also be obtained by subjecting the obtained polymer particle as necessary to filtration, washing, and drying using known methods. In addition, it may also optionally be introduced into a classification step and the coarse powder and fines present in the toner particle may be cut.

The obtained toner particle may also be used as such as toner. In addition, the toner may also be obtained by optionally mixing an external additive with the toner particle to attach same to the toner particle surface. The external additives described above may be used as the external additive here.

The stirring device used to carry out the mixing process should be a stirring device that can bring about the attachment of the external additive to the toner particle surface, but is not otherwise particularly limited. For example, the external addition process can be carried out using a stirrer capable of mixing and stirring, e.g., an FM Mixer (product name, Nippon Coke & Engineering Co., Ltd.), Supermixer (product name, Kawada Seisakusho Co. Ltd.), Q Mixer (product name, Nippon Coke & Engineering Co., Ltd.), Mechanofusion System (product name, Hosokawa Micron Corporation), and Mechanomill (product name, Okada Seiko Co., Ltd.).

The volume-average particle diameter (Dv) of the toner is preferably from 3.00 μm to 9.00 μm and is more preferably from 5.00 μm to 8.00 μm. A satisfactory dot reproducibility can be achieved, while providing excellent toner handling characteristics, by having the volume-average particle diameter (Dv) of the toner be in the indicated range.

In addition, the ratio (Dv/Dn) for the toner of the volume-average particle diameter (Dv) to the number-average particle diameter (Dn) is preferably equal to or less than 1.25 and is more preferably less than 1.25. Dv and Dv/Dn of the toner can be controlled through, for example, the amount of dispersing agent, the type of stirrer, the rotation rate, and so forth.

The weight-average molecular weight (Mw) of the binder resin is preferably 10,000 to 300,000, more preferably 15,000 to 260,000, and still more preferably 20,000 to 230,000. An improving trend for the low-temperature fixability is assumed when the weight-average molecular weight of the binder resin is not more than 300,000. An improving trend for the heat-resistant storability is assumed when the weight-average molecular weight of the binder resin is at least 10,000.

The molecular weight distribution (Mw/Mn) of the binder resin is preferably 2 to 40, more preferably 3 to 35, and still more preferably 3 to 23. An improving trend for the low-temperature fixability and storability is assumed when this molecular weight distribution is not greater than 40. An improving trend for the hot offset resistance is assumed when this molecular weight distribution is at least 2.

The methods used to measure the property values involved with the present disclosure are described in the following.

Measurement of the Content of Resin A in the Chloroform-Soluble Matter of the Toner Particle Using Gradient Polymer Elution Chromatograph (GPEC)

The sample is the chloroform-soluble matter from the toner particle. The sample submitted to measurement is provided by adjusting the toner particle concentration in chloroform to 0.1 mass % and filtering the resulting solution with a 0.45-μm PTFE filter. The measurement conditions for the gradient polymer LC are given below.

instrument: Ultimate 3000 (Thermo Fisher Scientific Inc.)

mobile phases: A chloroform (HPLC), B acetonitrile (HPLC)

gradient: 2 min (A/B=0/100)→25 min (A/B=100/0) (the gradient for the change in the mobile phase was linear)

flow rate: 1.0 mL/minute injection: 0.1 mass %×20 μL column: Tosoh TSKgel ODS (4.6 mm diameter×150 mm×5 μm)

column temperature: 40° C.

detector: Corona charged particle detector (Corona-CAD) (Thermo Fisher Scientific Inc.)

In the chromatogram (time—intensity) provided by this measurement, the peak signal appears at a time (chloroform/acetonitrile concentration) corresponding to the polarity of the material. The following Sa value and Sb value are determined in the chromatogram (time—intensity) yielded by the measurement, and the content of the resin A in the binder resin is measured using Sa/(Sa+Sb)×100(%).

Sa value: integration value of the peak present at (time 10 minutes to 13 minutes) corresponding to the resin A Sb value: integration value of the peak present at (time 4 minutes to 9.9 minutes) corresponding to the resin B Separation of a Toner Particle from Toner Measurements can be performed, as needed, using a toner particle obtained by removing the external additive from the toner, in accordance with the method below.

Herein 160 g of sucrose (by Kishida Chemical Co. Ltd.) are added to 100 mL of ion-exchanged water and are dissolved therein, while being warmed in a hot water bath, to prepare a sucrose concentrate. Then 31 g of this sucrose concentrate and 6 mL of Contaminon N (10 mass % aqueous solution of a pH-7 neutral detergent for cleaning of precision measuring instruments, made up of a nonionic surfactant, an anionic surfactant and an organic builder, by Wako Pure Chemical Industries, Ltd.) are introduced into a centrifuge tube (50 mL volume). Then 1.0 g of toner is added thereto, and toner clumps are broken up using a spatula or the like. The centrifuge tube is shaken in a shaker (AS⁻1N, sold by AS ONE Corporation) for 20 minutes at 300 spm (strokes per minute). After shaking, the solution is transferred to a glass tube (50 mL volume) for swing rotors, and is centrifuged under conditions of 3500 rpm for 30 minutes, using a centrifuge (H-9R, by Kokusan Co. Ltd.).

As a result of this operation the toner particle becomes separated from the external additive. Sufficient separation of the toner particle and the aqueous solution is checked visually, and the toner particle separated into the uppermost layer is retrieved using a spatula or the like. The retrieved toner particle is filtered through a vacuum filter and is then dried for 1 hour or longer in a dryer, to yield a measurement sample. This operation is carried out a plurality of times to secure a required amount.

Compositional Analysis of the Resin A and the Resin B

The sample is the chloroform-soluble matter from the toner particle. The sample submitted to measurement is provided by adjusting the toner particle concentration in chloroform to 0.1 mass % and filtering the resulting solution with a 0.45-μm PTFE filter. The measurement conditions for the gradient polymer LC are given below.

instrument: Ultimate 3000 (Thermo Fisher Scientific Inc.)

mobile phases: A chloroform (HPLC), B acetonitrile (HPLC)

gradient: 2 min (A/B=0/100)→25 min (A/B=100/0) (the gradient for the change in the mobile phase was linear)

flow rate: 1.0 mL/minute injection: 0.1 mass %×20 μL column: Tosoh TSKgel ODS (4.6 mm diameter×150 mm×5 μm)

column temperature: 40° C.

detector: Corona charged particle detector (Corona-CAD) (Thermo Fisher Scientific Inc.)

The resin A is fractionated at the time (10 minutes to 13 minutes) corresponding to the resin A. In addition, the resin B is fractioned at the time (4 minutes to 9.9 minutes) corresponding to the resin B. In the fractionation, the required amount of the chloroform/acetonitrile solution is respectively recovered and is dried and condensed to provide a sample of the resin A component and a sample of the resin B component.

The compositional ratios and mass ratios are measured using nuclear magnetic resonance spectroscopy (NMR) as follows using the sample of the resin A component and the sample of the resin B component.

1 mL of deuterochloroform is added to 20 mg of the sample of the resin A component or the sample of the resin B component and the proton-NMR spectrum of the dissolved resin is measured. The molar ratio and mass ratio of each monomer can be calculated from the resulting NMR spectrum and the content of each monomer unit can be determined. For example, in the case of a styrene-acrylic copolymer, the compositional ratio and mass ratio can be calculated based on the peak in the vicinity of 6.5 ppm that originates from the styrene monomer and based on the peak in the vicinity of 3.5 to 4.0 ppm that originates from the acrylic monomer.

The following instrumentation and measurement conditions can be used for the nuclear magnetic resonance spectroscopy (NMR).

NMR instrument: Resonance ECX500, JEOL Ltd.

measurement nucleus: proton measurement mode: single pulse

Measurement of the Molecular Weight of the Ester Compound by Mass Analysis

Separation of the Ester Compound from the Toner

The molecular weight of the ester compound in the toner can be determined by measurement of the toner, but the measurement is more preferably performed after carrying out a separation operation.

The toner is dispersed in ethanol, which is a poor solvent for the toner, and the temperature is raised to a temperature above the melting point of the ester compound. Pressure may be applied at this time as necessary. The ester compound, brought to above its melting point by this procedure, is melted and extracted into the ethanol. When pressure is applied in addition to the heating, the ester compound can be separated from the toner by performing solid-liquid separation as such under pressure.

The ester compound is then obtained by drying the extract to solidification. Identification of the ester compound and measurement of its molecular weight can be performed by carrying out pyrolysis GCMS using the following instrumentation and measurement conditions.

mass analysis instrument: ISQ, Thermo Fisher Scientific Inc.

GC instrument: Focus GC, Thermo Fisher Scientific Inc.
ion source temperature: 250° C.
ionization method: EI
mass range: 50 to 1000 m/z
column: HP-5MS [30 m]
pyrolysis instrument: JPS-700 from Japan Analytical Industry Co., Ltd.

A small amount of the ester compound separated by the extraction procedure and 1 μL of tetramethylammonium hydroxide (TMAH) are added to 590° C. pyrofoil. Pyrolysis GCMS measurement is carried out on the prepared sample using the conditions described above to obtain respective peaks for the alcohol component and carboxylic acid component deriving from the ester compound. When this is done, due to the action of the TMAH methylating agent, the alcohol component and carboxylic acid component are detected as the methylation products. The molecular weight of the ester compound can be determined by analysis of the obtained peaks and identification of the structure of the ester compound.

In addition, when the identification and molecular weight measurement are carried out by the direct introduction of the ester compound, this can be carried out, for example, using the instrumentation and measurement conditions given below.

mass analysis instrument: ISQ, Thermo Fisher Scientific Inc.
ion source temperature: 250° C., electron energy: 70 eV
mass range: 50 to 1000 m/z (Cl)
reagent gas: methane (CI)
ionization method: Direct Exposure Probe (DEP), Thermo Fisher Scientific Inc., 0 mA (10 sec)–10 mA/sec–1000 mA (10 sec)

The measurement is run by directly mounting the ester compound separated by the extraction procedure on the filament element of the DEP unit. The molecular ion in the mass spectrum of the main component peak in the vicinity of 0.5 minute to 1 minute in the obtained chromatogram is identified and the ester compound is identified and the molecular weight is determined.

Method for Measuring the Content of the Ester Compound in the Toner

The content of the ester compound in the toner can be measured using a thermal analyzer (product name: DSC Q2000, TA Instruments Japan Co., Ltd.).

5.0 mg of the toner is introduced into an aluminum pan (Kit No. 0219-0041) sample container and the sample container is mounted in the holder unit and set in the electric oven. The DSC curve is measured with the differential scanning calorimeter (DSC) by heating from 30° C. to 200° C. in a nitrogen atmosphere at a ramp rate of 10° C./minute and the endothermic quantity for the ester compound in the toner is calculated. The endothermic quantity is calculated using the same method and using a 5.0 mg sample of the pure ester compound. The wax content is determined using the following formula and using the endothermic quantities for the ester compound obtained in each of these measurements.

ester compound content in the toner(mass %)=(endothermic quantity for the ester compound in the toner sample (J/g))/(endothermic quantity for the pure ester compound (J/g))×100

Volume-Average Particle Diameter Dv and Particle Diameter Distribution Dv/Dn of the Toner The volume-average particle diameter Dv, number-average particle diameter Dn, and particle diameter distribution Dv/Dn of the toner is measured using a particle diameter analyzer (product name: Multisizer, Beckman Coulter, Inc.). Measurement with the Multisizer is performed using the following conditions: aperture diameter: 100 μm, dispersion medium: ISOTON II (product name), 10% concentration, number of particles measured: 100,000.

Specifically, 0.2 g of the toner is taken to a beaker and an aqueous alkylbenzenesulfonic acid solution (product name: DRIWEL, Fujifilm Corporation) is added to this as a dispersing agent. 2 mL of the dispersion medium is additionally added to wet the toner, after which 10 mL of the dispersion medium is added, dispersion is carried out for 1 minute using an ultrasound disperser, and the measurement is then performed using the aforementioned particle diameter analyzer.

Method for Measuring the Melting Point of the Ester Compound 6 mg to 8 mg of the ester compound is measured into the sample holder, and the DSC curve is obtained by carrying out measurement using a differential scanning calorimeter (product name: RDC-220, Seiko Instruments Inc.) and a ramp-up condition of 10° C./min from −20° C. to 100° C. The peak temperature of the endothermic peak in this DSC curve is taken to be the melting point.

Method for Measuring the Glass Transition Temperature of the Toner

The glass transition temperature of the toner is measured in accordance with ASTM D 3418-97.

Specifically, 10 mg of the toner provided by drying is exactly weighed and is introduced into an aluminum pan. An empty aluminum pan is used as the reference. Using a differential scanning calorimeter (product name: DSC6220, SII NanoTechnology Inc.), the glass transition temperature of the exactly weighed toner is measured in accordance with ASTM D 3418-97 at a ramp rate condition of 10° C./min in the measurement temperature range from 0° C. to 150° C.

Method for Measuring the Weight-Average Molecular Weight (Mw) and Peak Molecular Weight (Mp) of, e.g., the Resins The weight-average molecular weight (Mw) and peak molecular weight (Mp) of the resin are measured as follows using gel permeation chromatography (GPC).

(1) Preparation of the Measurement Sample

The sample and tetrahydrofuran (THF) are mixed at a concentration of 5.0 mg/mL; standing is carried out for 5 hours to 6 hours at room temperature; and thorough shaking is then carried out and the THF and sample are well mixed until there is no sample aggregation. Additional standing at quiescence at room temperature for at least 12 hours is performed. During this process, the time from the sample+THF mixing starting point to the end point of standing at quiescence is brought to at least 72 hours, to obtain the tetrahydrofuran (THF)-soluble matter of the sample.

A sample solution is then obtained by filtration across a solvent-resistant membrane filter (pore size from 0.45 μm to 0.50 μm, Sample Pretreatment Cartridge H-25-2 [Tosoh Corporation]).

(2) Measurement of the Sample

Measurement is carried out under the following conditions using the obtained sample solution.

instrument: LC-GPC 150C high-performance GPC instrument (Waters Corporation)
column: 7-column train of Shodex GPC KF-801, 802, 803, 804, 805, 806, and 807 (Showa Denko Kabushiki Kaisha)
mobile phase: THF
flow rate: 1.0 mL/min
column temperature: 40° C.

sample injection amount: 100 μL detector: RI (refractive index) detector

With regard to measurement of the sample molecular weight, the molecular weight distribution possessed by the sample is calculated from the relationship between the logarithmic value and number of counts in a calibration curve constructed using multiple monodisperse polystyrene reference samples.

The molecular weights of the polystyrene reference samples used to construct the calibration curve are as follows (from Pressure Chemical Co. or Tosoh Corporation): $6.0\times10^2$, $2.1\times10^3$, $4.0\times10^3$, $1.75\times10^4$, $5.1\times10^4$, $1.1\times10^5$, $3.9\times10^5$, $8.6\times10^5$, $2.0\times10^6$, and $4.48\times10^6$.

Method for Measuring the Area Occupied by Wax Domains in the Toner Cross Section Using a Transmission Electron Microscope Observation of the cross section and evaluation of the wax domains is carried out on the toner proceeding as follows using a transmission electron microscope (TEM). Crystalline material is obtained as a clear contrast by ruthenium staining of the toner cross section. Crystalline material is stained more weakly than noncrystalline material. This is thought to be due to the following: penetration of the stain into crystalline material is weaker than for noncrystalline material due to, e.g., differences in density.

Due to differences in the amount of ruthenium atom as a function of the strength/weakness of the staining, strongly stained regions contain large amounts of the ruthenium atom and appear black on the observed image because the electron beam is impeded from passing through. On the other hand, the weakly stained regions contain little ruthenium atom and are then easily traversed by the electron beam and appear white on the observed image.

Using an osmium plasma coater (OPC80T, Filgen, Inc.), an osmium film (5 nm) and a naphthalene film (20 nm) are executed on the toner as protective films. After embedding with D800 photocurable resin (JEOL Ltd.), toner cross sections with a film thickness of 60 nm are prepared using an ultrasound ultramicrotome (UC7, Leica) and a slicing rate of 1 mm/s.

The obtained cross sections are stained for 15 minutes in a 500 Pa $RuO_4$ gas atmosphere using a vacuum electron staining device (VSC4R1H, Filgen, Inc.) and are submitted to STEM observation using the STEM mode of a TEM (JEM2800, JEOL Ltd.). The STEM probe size is 1 nm, and acquisition is carried out at an image size of 1024 pixels×1024 pixels.

The resulting images are binarized (threshold 120/255 gradation scale) using "Image-Pro Plus" (Media Cybernetics, Inc.) image processing software. The crystalline domains can be extracted by performing binarization.

Method for Calculating the Average Number of Ester Compound Domains and the Average Long Diameter r1 (μm) of the Ester Compound Domains Observation was carried out by the method described in the preceding for observing the toner cross section, and 50 of those within ±2.0 μm of the volume-average particle diameter of the toner are randomly selected and are photographed to obtain cross-sectional images. The development of Ru staining of crystalline material is impeded in comparison to noncrystalline resin and magnetic bodies, and crystalline material appears as white to grey in these cross-sectional images.

For the average number of ester compound domains, the number of domains having a long diameter of at least 20 nm in the aforementioned 50 toner cross-sectional images is counted, and the average value over the 50 toner particles is taken to be the average number of ester compound domains.

For the average long diameter r1 (μm) of the ester compound domains, 10 cross sections are randomly selected from among the aforementioned toner cross-sectional images, and the long diameter is measured on 100 ester compound domains randomly selected from within these 10 cross sections. The average value of these is taken to be the average long diameter r1 (μm) of the ester compound domains in the toner cross section.

Method for Measuring the Average Circularity of the Toner

The average circularity of the toner is measured using an "FPIA-3000" (Sysmex Corporation), a flow particle image analyzer, and using the measurement and analysis conditions from the calibration process.

The specific measurement procedure is as follows.

First, 20 mL of deionized water—from which, e.g., solid impurities, have been removed in advance—is introduced into a glass vessel. To this is added as dispersing agent 0.2 mL of a dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

0.02 g of the measurement sample is added and a dispersion treatment is carried out for 2 minutes using an ultrasound disperser to provide a dispersion to be used for the measurement. Cooling is carried out as appropriate during this process in order to have the temperature of the dispersion be from 10° C. to 40° C. Using a "VS-150" (Velvo-Clear Co., Ltd.) benchtop ultrasound cleaner/disperser, which has an oscillation frequency of 50 kHz and an electrical output of 150 W, as an ultrasound disperser, a prescribed amount of deionized water is introduced into the water tank and 2 mL of Contaminon N is added to the water tank.

The aforementioned flow particle image analyzer fitted with a "LUCPLFLN" objective lens (20×, numerical aperture: 0.40) is used for the measurement, and "PSE-900A" (Sysmex Corporation) particle sheath is used for the sheath solution. The dispersion prepared according to the procedure described above is introduced into the flow particle image analyzer and 2,000 of the magnetic toner are measured in HPF measurement mode and total count mode. The average circularity of the toner is calculated from the results.

Dynamic Viscoelastic Measurement on the Toner

An "Ares" (TA Instruments) rotational flat plate rheometer is used as the measurement instrument. A sample provided by compression molding the toner in a 25° C. environment using a tablet molder into a cylindrical shape of diameter=7.9 mm and thickness=2.0±0.3 mm is used as the measurement sample. This sample is installed in the parallel plates and the temperature is raised from room temperature (25° C.) to the viscoelastic measurement start temperature (50° C.) and measurement using the following conditions is started.

The measurement conditions are as follows.

(1) The sample is set so as to provide an initial normal force of 0.

(2) Parallel plates with a diameter of 7.9 mm are used.

(3) A frequency (Frequency) of 1.0 Hz is used.

(4) The initial value of the applied strain (Strain) is set to 0.1%.

(5) The measurement is carried out at from 50° C. to 160° C. at a ramp rate (Ramp Rate) of 2.0° C./min and a sampling frequency of 1 time/° C.

The measurement is run using the following setting conditions for automatic adjustment mode. The measurement is run in automatic strain adjustment mode (Auto Strain).

(6) The maximum strain (Max Applied Strain) is set to 20.0%.

(7) The maximum torque (Max Allowed Torque) is set to 200.0 g cm and the minimum torque (Min Allowed Torque) is set to 0.2 g·cm.

(8) The strain adjustment (Strain Adjustment) is set to 20.0% of Current Strain. Automatic tension adjustment mode (Auto Tension) is adopted for the measurement.

(9) The automatic tension direction (Auto Tension Direction) is set to compression (Compression).

(10) The initial static force (Initial Static Force) is set to 10.0 g and the automatic tension sensitivity (Auto Tension Sensitivity) is set to 40.0 g.

(11) For the automatic tension (Auto Tension) operating condition, the sample modulus (Sample Modulus) is equal to or greater than $1.0\times10^3$ (Pa).

The loss elastic modulus G" (dyn/cm$^2$) of the toner at 100° C. according to dynamic viscoelastic measurement is taken to be the value of the loss elastic modulus G" at 100° C. in this measurement.

Measurement of the Surface Nitrogen Quantity Index of the Toner

The surface nitrogen quantity index of the toner is determined using x-ray photoelectron spectroscopic analysis (ESCA) and proceeding as follows. The targeted elements are C (carbon atom), N (nitrogen atom), 0 (oxygen atom), and Si (silicon atom). The ESCA instrument and the measurement conditions are as follows.

instrument used: Model 1600S x-ray photoelectron spectrometer, Ulvac-Phi, Incorporated measurement conditions: Mg Kα (400 W) x-ray source spectroscopic region: 800 μmø

The surface atomic concentrations are calculated, using the relative sensitivity factors provided by Ulvac-Phi, Incorporated, from the peak intensities measured for each element. The peak top ranges for each element are as follows.

C1s: 279 to 297 eV

N1s: 392 to 410 eV

O1s: 524 to 542 eV

Si2p: 95 to 113 eV

The surface nitrogen quantity index is taken to be the nitrogen atom occurrence (atomic %) determined by normalization such that the sum total of the atomic % for each atom, i.e., C, N, O, and Si, using the peak top range for each element is 100 atomic %.

EXAMPLES

The present disclosure is specifically described in the following using examples, but the present disclosure is not limited to or by these examples. The number of parts in the examples is on a mass basis unless specifically indicated otherwise.

Method for Producing Ester Compound 1

100 parts of behenyl alcohol as alcohol monomer and 80 parts of stearic acid as carboxylic acid monomer were introduced into a reactor fitted with a thermometer, nitrogen introduction line, stirrer, Dean-Stark trap, and Dimroth condenser, and an esterification reaction was run for 15 hours at 200° C.

20 parts toluene and 25 parts isopropanol were added to the obtained ester compound; 190 parts of a 10% aqueous potassium hydroxide solution, a quantity corresponding to 1.5-times the acid value of the ester compound, was added; and stirring was carried out for 4 hours at 70° C. This was followed by removal of the aqueous phase. Washing was performed by introducing 20 parts of deionized water, stirring for 1 hour at 70° C., and then removing the aqueous phase. This washing procedure was repeated until the pH of the removed aqueous phase reached neutrality.

The solvent was then removed by reducing the pressure using conditions of 200° C. and 1 kPa to obtain behenyl stearate (ester compound 1), the behenyl alcohol/stearic acid ester compound that is the ultimate target compound. The properties of the obtained ester compound 1 are given in Table 1.

Method for Producing Ester Compounds 2 to 5

Ester compounds 2 to 5 were obtained proceeding as in the Method for Producing Ester Compound 1, but changing the monomer so as to obtain the compounds in Table 1. The properties of the obtained ester compounds 2 to 5 are shown in Table 1.

TABLE 1

| | | structure | SPw (J/cm$^3$)$^{1/2}$ | melting point (° C.) |
|---|---|---|---|---|
| ester compound 1 | behenyl stearate | formula (7) | 17.57 | 67 |
| ester compound 2 | behenyl behenate | formula (7) | 17.56 | 73 |
| ester compound 3 | ethylene glycol distearate | formula (5) | 18.11 | 76 |
| ester compound 4 | dibehenyl sebacate | formula (6) | 17.94 | 73 |
| ester compound 5 | pentaerythritol tetrastearate | — | 18.27 | 77 |

Resin B1 Production Example 100 parts of a monomer mixture of 81 parts of styrene, 16 parts of n-butyl acrylate, and 3 parts of benzyldimethylammoniumethyl methacrylate chloride, were introduced into 900 parts of toluene in a 2-L flask fitted with a stirrer, condenser, thermometer, and nitrogen introduction line, and a polymerization reaction was run for 8 hours at 75° C. in the presence of 4 parts of azobisdimethylvaleronitrile. After the completion of the polymerization reaction, the toluene was distilled off, followed by drying under reduced pressure at 40° C., then coarse pulverization with a hammer mill, and additionally drying of the coarse pulverizate under reduced pressure for 48 hours at 40° C. to yield the resin B1. The properties of the obtained resin B1 were Mw=21,000 and Tg=60° C.

Resins B2 to B7 Production Example

Resins B2 to B7 were obtained proceeding as in the Resin B1 Production Example, but changing the blending amounts in the Resin B1 Production Example as shown in Table 2. The numerical values in the table indicate the number of parts of the particular monomer.

TABLE 2

| | structure | resin B1 | resin B2 | resin B3 | resin B4 |
|---|---|---|---|---|---|
| styrene | formula (4) | 81.0 | 51.0 | 81.0 | 81.0 |
| n-butyl acrylate | — | 16.0 | 19.0 | 14.0 | 16.0 |
| methyl methacrylate | formula (8) | 0.0 | 29.0 | 0.0 | 0.0 |
| quaternary ammonium salt group | formula (3) | benzyldimethyl-ammoniumethyl methacrylate chloride 3.0 | benzyldimethyl-ammoniumethyl methacrylate chloride 1.0 | benzyldimethyl-ammoniumethyl methacrylate chloride 5.0 | trimethyl-ammoniumethyl methacrylate chloride 3.0 |
| long-chain acrylate | formula (1) | — 0.0 | — 0.0 | — 0.0 | — 0.0 |

| | structure | resin B5 | resin B6 | resin B7 |
|---|---|---|---|---|
| styrene | formula (4) | 81.0 | 81.0 | 45.0 |
| n-butyl acrylate | — | 15.1 | 14.5 | 17.0 |
| methyl methacrylate | formula (8) | 0.0 | 0.0 | 35.0 |
| quaternary ammonium salt group | formula (3) | benzyldimethyl-ammoniumethyl methacrylate chloride 3.0 | benzyldimethyl-ammoniumethyl methacrylate chloride 3.0 | benzyldimethyl-ammoniumethyl methacrylate chloride 3.0 |
| long-chain acrylate | formula (1) | lauryl acrylate 0.9 | lauryl acrylate 1.5 | — 0.0 |

Toner Particle 1 Production Method

- styrene: 81 parts
- n-butyl acrylate: 11 parts
- lauryl acrylate: 6 parts
- divinylbenzene: 1 part
- resin B: 2.06 parts
- colorant: carbon black (product name: #25B, Mitsubishi Chemical Corporation) 7 parts
- molecular weight modifier: tetraethylthiuram disulfide 1 part These materials were stirred and mixed in an ordinary stirrer and then, using a media-based disperser, were dispersed to uniformity and were heated to 63° C. To this was added 20 parts of ester compound 1, 5 parts of a Fischer-Tropsch wax (HNP51, Nippon Seiro Co., Ltd.) was admixed as a release agent, and dissolution was carried out to obtain a polymerizable monomer composition.

Otherwise, an aqueous solution of 4.1 parts of sodium hydroxide dissolved in 50 parts of deionized water was gradually added, at room temperature with stirring, to an aqueous solution of 7.4 parts of magnesium chloride dissolved in 250 parts of deionized water in a stirred container, to prepare a magnesium hydroxide colloidal dispersion (3.0 parts magnesium hydroxide).

The aforementioned polymerizable monomer composition was introduced at room temperature into the magnesium hydroxide colloidal dispersion obtained as described above; the temperature was raised to 60° C.; stirring was performed until the liquid droplets were stable; to this was added 5 parts of t-butyl peroxy-2-ethylhexanoate (product name: Perbutyl O, NOF Corporation) as a polymerization initiator; and liquid droplets of the polymerizable monomer composition were formed by high-shear stirring at a rotation rate of 15,000 rpm using an inline emulsifier/disperser (product name: Milder, Pacific Machinery & Engineering Co., Ltd.).

The resulting magnesium hydroxide colloidal dispersion in which liquid droplets of the polymerizable monomer composition were dispersed, was introduced into a reactor equipped with stirring blades, and the temperature was raised to 89° C. and a polymerization reaction was run while exercising control so as to provide a constant temperature. Then, when the polymerization conversion had reached 98%, the temperature in the system was cooled to 75° C., and, after 15 minutes after reaching 75° C., 1 part of methyl methacrylate as shell polymerizable monomer and 0.36 parts of 2,2'-azobis[2-methyl-N-(1,1-bis(hydroxymethyl)-2-hydroxyethyl)propionamide] tetrahydrate (product name: VA-086, Wako Pure Chemical Industries, Ltd.) dissolved in 10 parts of deionized water were added. Polymerization was continued for an additional 3 hours and the reaction was then stopped to yield an aqueous dispersion of colored resin particles with a pH of 9.5.

The aqueous dispersion of colored resin particles was subsequently brought to 90° C. and a stripping treatment was performed for 5 hours at a nitrogen gas flow rate of 0.6 $m^3/(hr \cdot kg)$. This was followed by the introduction of 0° C. water into the suspension as a cooling step and, after cooling the suspension from 98.0° C. to 30° C. at a cooling rate of 3.0° C./sec, the temperature was raised to 48° C. and holding for 6 hours was carried out. This was followed by natural cooling at room temperature to 25° C. The cooling rate at this time was 1° C./minute.

Then, while stirring the resulting aqueous dispersion, an acid wash was performed by bringing the pH of the system to 6.5 or less using sulfuric acid; the water was separated by filtration; and a water wash was then performed by re-slurrying with the addition of a fresh 500 parts of deionized water. The dewatering and water wash were repeated a plurality of times, the solid fraction was separated by filtration, and drying in a dryer was subsequently carried out for 12 hours at a temperature of 40° C. to yield a toner particle 1.

To the toner particle 1 (100 parts) obtained proceeding as described above were added 0.7 parts of hydrophobed silica fine particles having a number-average primary particle diameter of 7 nm and 1 part of hydrophobed silica fine particles having a number-average primary particle diameter of 50 nm, and mixing was carried out using a high-speed stirrer (product name: FM Mixer, Nippon Coke & Engineering Co., Ltd.) to produce the toner 1. The properties of the obtained toner 1 are given in Table 3-2.

Production of Toners 2 to 32

Toner particles 2 to 32 were obtained proceeding as for toner particle 1, but changing the formulation and the cooling rate in the cooling step as indicated in Tables 3-1, 3-3, and 3-5. Toners 2 to 32 were obtained by carrying out external addition as for toner 1 on the resulting toner particles. The toner properties are given in Tables 3-2, 3-4, and 3-6.

TABLE 3-1

| | | toner particle | | | | | |
|---|---|---|---|---|---|---|---|
| | | 1 | 2 | 3 | 4 | 5 | 6 |
| production method | | suspension polymerization | suspension polymerization | suspension polymerization | suspension polymerization | suspension polymerization | suspension polymerization |
| resin ratio | resin A | 97.0 | 95.0 | 98.0 | 97.0 | 97.0 | 97.0 |
| | resin B | 2.0 | 4.0 | 1.0 | 2.0 | 2.0 | 2.0 |
| | shell monomer | metyl methacrylate 1.0 | metyl methacrylate 1.0 | metyl methacrylate 1.0 | metyl methacrylate 1.0 | metyl methacrylate 1.0 | metyl methacrylate 1.0 |
| resin A | styrene | 81.0 | 79.0 | 82.5 | 48.0 | 82.0 | 81.0 |
| | BA | 11.0 | 10.5 | 11.0 | 9.7 | 11.0 | 14.0 |
| | MMA | 0.0 | 0.0 | 0.0 | 31.0 | 0.0 | 0.0 |
| | long-chain Ac | lauryl acrylate 6 | lauryl methacrylate 8 | lauryl acrylate 3 | lauryl acrylate 10 | lauryl acrylate 6 | lauryl acrylate 3 |
| | divinylbenzene | 1.0 | 1.0 | 1.0 | 1.0 | 1.0 | 1.0 |
| | quaternary ammonium salt group | — 0.0 | — 0.0 | — 0.0 | — 0.0 | — 0.0 | — 0.0 |
| molecular weight modifier | molecular weight modifier | tetraethyl-thiuram disulfide | n-dodecyl mercaptan | t-dodecyl mercaptan | n-octyl mercaptan | — | tetraethyl-thiuram disulfide |
| | amount of addition | 1.0 | 1.5 | 2.5 | 0.3 | 0.0 | 1.0 |
| polymerization initiator | t-butyl peroxy-2-ethylhexanoate | 5.0 | 5.0 | 5.0 | 5.0 | 5.0 | 5.0 |
| resin B | resin B No. | resin B1 | resin B2 | resin B3 | resin B4 | resin B1 | resin B1 |
| | styrene | 81.0 | 51.0 | 81.0 | 81.0 | 81.0 | 81.0 |
| | BA | 16.0 | 19.0 | 14.0 | 16.0 | 16.0 | 16.0 |
| | MMA | 0.0 | 29.0 | 0.0 | 0.0 | 0.0 | 0.0 |
| | quaternary ammonium salt group | benzyldimethyl-ammoniumethyl methacrylate chloride 3.0 | benzyldimethyl-ammoniumethyl methacrylate chloride 1.0 | benzyldimethyl-ammoniumethyl methacrylate chloride 5.0 | trimethyl-ammoniumethyl methacrylate chloride 3.0 | benzyldimethyl-ammoniumethyl methacrylate chloride 3.0 | benzyldimethyl-ammoniumethyl methacrylate chloride 3.0 |
| | lauryl acrylate | — 0.0 | — 0.0 | — 0.0 | — 0.0 | — 0.0 | — 0.0 |
| ester compound | ester compound | ester compound 1 | ester compound 2 | ester compound 3 | ester compound 4 | ester compound 1 | ester compound 1 |
| | amount of addition | 20.0 | 15.0 | 12.0 | 10.0 | 20.0 | 20.0 |
| hydrocarbon | hydrocarbon | HNP51 | HNP51 | HNP51 | HNP51 | HNP51 | HNP51 |
| | amount of addition | 5.0 | 5.0 | 5.0 | 5.0 | 5.0 | 5.0 |
| cooling rate (° C./sec) | | 3.0 | 3.0 | 3.0 | 3.0 | 3.0 | 3.0 |

| | | toner particle | | | | |
|---|---|---|---|---|---|---|
| | | 7 | 8 | 9 | 10 | 11 |
| production method | | suspension polymerization | suspension polymerization | suspension polymerization | suspension polymerization | suspension polymerization |
| resin ratio | resin A | 97.0 | 97.0 | 97.0 | 97.0 | 97.0 |
| | resin B | 2.0 | 2.0 | 2.0 | 2.0 | 2.0 |
| | shell monomer | metyl methacrylate 1.0 | metyl methacrylate 1.0 | metyl methacrylate 1.0 | metyl methacrylate 1.0 | metyl methacrylate 1.0 |
| resin A | styrene | 81.0 | 81.0 | 81.0 | 81.0 | 81.0 |
| | BA | 2.0 | 16.0 | 14.0 | 14.0 | 15.0 |
| | MMA | 0.0 | 0.0 | 0.0 | 0.0 | 0.0 |
| | long-chain Ac | lauryl acrylate 15 | lauryl acrylate 1 | decyl acrylate 3 | tetradecyl acrylate 3 | decyl acrylate 2 |

TABLE 3-1-continued

| | | | | | | |
|---|---|---|---|---|---|---|
| | divinylbenzene | 1.0 | 1.0 | 1.0 | 1.0 | 1.0 |
| | quaternary ammonium salt group | —<br>0.0 | —<br>0.0 | —<br>0.0 | —<br>0.0 | —<br>0.0 |
| molecular weight modifier | molecular weight modifier | tetraethyl-thiuram disulfide | tetraethyl-thiuram disulfide | tetraethyl-thiuram disulfide | tetraethyl-thiuram disulfide | tetraethyl-thiuram disulfide |
| | amount of addition | 1.0 | 1.0 | 1.0 | 1.0 | 1.0 |
| polymerization initiator | t-butyl peroxy-2-ethylhexanoate | 5.0 | 5.0 | 5.0 | 5.0 | 5.0 |
| resin B | resin B No. | resin B1 | resin B1 | resin B1 | resin B1 | resin B1 |
| | styrene | 81.0 | 81.0 | 81.0 | 81.0 | 81.0 |
| | BA | 16.0 | 16.0 | 16.0 | 16.0 | 16.0 |
| | MMA | 0.0 | 0.0 | 0.0 | 0.0 | 0.0 |
| | quaternary ammonium salt group | benzyldimethyl-ammoniumethyl methacrylate chloride<br>3.0 | benzyldimethyl-ammoniumethyl methacrylate chloride<br>3.0 | benzyldimethyl-ammoniumethyl methacrylate chloride<br>3.0 | benzyldimethyl-ammoniumethyl methacrylate chloride<br>3.0 | benzyldimethyl-ammoniumethyl methacrylate chloride<br>3.0 |
| | lauryl acrylate | —<br>0.0 | —<br>0.0 | —<br>0.0 | —<br>0.0 | —<br>0.0 |
| ester compound | ester compound | ester compound 1 | ester compound 1 | ester compound 1 | ester compound 1 | ester compound 1 |
| | amount of addition | 20.0 | 20.0 | 20.0 | 20.0 | 20.0 |
| hydrocarbon | hydrocarbon | HNP51 | HNP51 | HNP51 | HNP51 | HNP51 |
| | amount of addition | 5.0 | 5.0 | 5.0 | 5.0 | 5.0 |
| cooling rate (° C./sec) | | 3.0 | 3.0 | 3.0 | 3.0 | 3.0 |

The numerical values for the individual materials in Tables 3-1, 3-3, and 3-5 refer to the number of parts. The numerical values for the resin ratio refers to mass %.

TABLE 3-2

| | | toner | | | | | |
|---|---|---|---|---|---|---|---|
| | | 1 | 2 | 3 | 4 | 5 | 6 |
| content of resin A in chloroform-soluble matter of toner particle | | 97 | 95 | 98 | 97 | 97 | 97 |
| content of formula (1) monomer unit in resin A | | 6.0 | 8.0 | 3.0 | 10.0 | 6.0 | 3.0 |
| content of formula (2) monomer unit in resin A | | 81.0 | 79.0 | 82.5 | 48.0 | 82.0 | 81.0 |
| presence/absence of sulfide group in resin A | | ○ | ○ | ○ | ○ | x | ○ |
| presence/absence of formula (8) in resin A | | ○ | ○ | ○ | ○ | ○ | ○ |
| content of formula (3) monomer unit in resin A | | 0.0 | 0.0 | 0.0 | 0.0 | 0.0 | 0.0 |
| content of formula (4) monomer unit in resin B | | 81.0 | 51.0 | 81.0 | 81.0 | 81.0 | 81.0 |
| content of formula (1) monomer unit in resin B | | 0.0 | 0.0 | 0.0 | 0.0 | 0.0 | 0.0 |
| SP value relationship | SPm | 18.72 | 18.72 | 18.72 | 18.72 | 18.72 | 18.72 |
| | SPw | 17.57 | 17.56 | 18.11 | 17.94 | 17.57 | 17.57 |
| | \| SPm − SPw \| | 1.15 | 1.16 | 0.61 | 0.78 | 1.15 | 1.15 |
| G'' (dyn/$cm^2$) | | $6.2 \times 10^4$ | $1.1 \times 10^5$ | $4.8 \times 10^4$ | $2.9 \times 10^5$ | $1.4 \times 10^5$ | $9.0 \times 10^4$ |
| average circularity | | 0.98 | 0.98 | 0.98 | 0.98 | 0.98 | 0.98 |
| average number of ester compound domains | | 480 | 450 | 421 | 400 | 210 | 350 |
| average long diameter r1 | | 0.03 | 0.03 | 0.08 | 0.03 | 0.20 | 0.06 |
| surface nitrogen quantity index | | 1.0 | 1.5 | 0.8 | 0.7 | 0.16 | 0.6 |

| | toner | | | | |
|---|---|---|---|---|---|
| | 7 | 8 | 9 | 10 | 11 |
| content of resin A in chloroform-soluble matter of toner particle | 97 | 97 | 97 | 97 | 97 |

TABLE 3-2-continued

| | | | | | | |
|---|---|---|---|---|---|---|
| content of formula (1) monomer unit in resin A | | 15.0 | 1.0 | 3.0 | 3.0 | 2.0 |
| content of formula (2) monomer unit in resin A | | 81.0 | 81.0 | 81.0 | 81.0 | 81.0 |
| presence/absence of sulfide group in resin A | | ○ | ○ | ○ | ○ | ○ |
| presence/absence of formula (8) in resin A | | ○ | ○ | ○ | ○ | ○ |
| content of formula (3) monomer unit in resin A | | 0.0 | 0.0 | 0.0 | 0.0 | 0.0 |
| content of formula (4) monomer unit in resin B | | 81.0 | 81.0 | 81.0 | 81.0 | 81.0 |
| content of formula (1) monomer unit in resin B | | 0.0 | 0.0 | 0.0 | 0.0 | 0.0 |
| SP value | SPm | 18.72 | 18.72 | 18.89 | 18.58 | 18.89 |
| relationship | SPw | 17.57 | 17.57 | 17.57 | 17.57 | 17.57 |
| | \| SPm − SPw \| | 1.15 | 1.15 | 1.32 | 1.01 | 1.32 |
| G'' ($dyn/cm^2$) | | 3.0 × 10ˆ4 | 2.8 × 10ˆ5 | 1.5 × 10ˆ5 | 1.6 × 10ˆ5 | 5.5 × 10ˆ5 |
| average circularity | | 0.98 | 0.98 | 0.98 | 0.98 | 0.98 |
| average number of ester compound domains | | 310 | 250 | 195 | 190 | 175 |
| average long diameter r1 | | 0.06 | 0.09 | 0.20 | 0.20 | 0.20 |
| surface nitrogen quantity index | | 2.0 | 0.4 | 0.3 | 0.3 | 0.3 |

In Tables 3-2, 3-4, and 3-6, the unit for the content of resin A and the content of the individual monomer units is mass %. The unit for the SP value is $(J/cm^3)^{1/2}$, and the unit for r1 is μm. An expression such as 6.2×10ˆ4 indicates $6.2\times10^4$. The unit for the surface nitrogen quantity index is atomic %.

With regard to "presence/absence of sulfide group in resin A", a ○ indicates that the resin A has at least one selection from the group consisting of the sulfide group and disulfide group, while an×indicates the absence of same. With regard to "presence/absence of formula (8) in resin A", a ○ indicates that the resin A has the monomer unit with formula (8), while an×indicates the absence of same.

TABLE 3-3

| | | toner particle | | | | | |
|---|---|---|---|---|---|---|---|
| | | 12 | 13 | 14 | 15 | 16 | 17 |
| production method | | suspension polymerization | pulverization | suspension polymerization | suspension polymerization | pulverization | suspension polymerization |
| resin ratio | resin A | 97.0 | 71.0 | 99.0 | 99.5 | 61.0 | 97.0 |
| | resin B | 3.0 | 29.0 | 1.0 | 0.5 | 39.0 | 3.0 |
| | shell monomer | — | — | — | — | — | — |
| | | 0.0 | 0.0 | 0.0 | 0.0 | 0.0 | 0.0 |
| resin A | styrene | 80.9 | 80.9 | 80.9 | 80.9 | 80.9 | 80.9 |
| | BA | 15.0 | 15.0 | 15.0 | 15.0 | 15.0 | 15.0 |
| | MMA | 0.0 | 0.0 | 0.0 | 0.0 | 0.0 | 0.0 |
| | long-chain Ac | decyl acrylate | decyl acrylate | decyl acrylate | decyl acrylate | decyl acrylate | decyl acrylate |
| | | 2.1 | 2.1 | 2.1 | 2.1 | 2.1 | 2.1 |
| | divinylbenzene | 1.0 | 1.0 | 1.0 | 1.0 | 1.0 | 1.0 |
| | quaternary | — | — | — | — | — | — |
| | ammonium salt | 0.0 | 0.0 | 0.0 | 0.0 | 0.0 | 0.0 |
| molecular weight modifier | molecular weight modifier | tetraethyl-thiuram disulfide | tetraethyl-thiuram disulfide | tetraethyl-thiuram disulfide | tetraethyl-thiuram disulfide | tetraethyl-thiuram disulfide | tetraethyl-thiuram disulfide |
| | amount of addition | 1.0 | 1.0 | 1.0 | 1.0 | 1.0 | 1.0 |
| polymerization initiator | t-butyl peroxy-2-ethylhexanoate | 5.0 | 5.0 | 5.0 | 5.0 | 5.0 | 5.0 |
| resin B | resin B No. | resin B1 | resin B1 | resin B1 | resin B1 | resin B1 | resin B1 |
| | styrene | 81.0 | 81.0 | 81.0 | 81.0 | 81.0 | 81.0 |
| | BA | 16.0 | 16.0 | 16.0 | 16.0 | 16.0 | 16.0 |
| | MMA | 0.0 | 0.0 | 0.0 | 0.0 | 0.0 | 0.0 |
| | quaternary ammonium salt | benzyldimethyl-ammoniumethyl methacrylate chloride | benzyldimethyl-ammoniumethyl methacrylate chloride | benzyldimethyl-ammoniumethyl methacrylate chloride | benzyldimethyl-ammoniumethyl methacrylate chloride | benzyldimethyl-ammoniumethyl methacrylate chloride | benzyldimethyl-ammoniumethyl methacrylate chloride |
| | | 3.0 | 3.0 | 3.0 | 3.0 | 3.0 | 3.0 |
| | lauryl | — | — | — | — | — | — |
| | acrylate | 0.0 | 0.0 | 0.0 | 0.0 | 0.0 | 0.0 |

TABLE 3-3-continued

| | | | | | | | |
|---|---|---|---|---|---|---|---|
| ester compound | ester compound | ester compound 1 | ester compound 1 | ester compound 1 | ester compound 1 | ester compound 1 | ester compound 1 |
| | amount of addition | 20.0 | 20.0 | 20.0 | 20.0 | 20.0 | 20.0 |
| hydrocarbon | hydrocarbon | HNP51 | HNP51 | HNP51 | HNP51 | HNP51 | HNP51 |
| | amount of addition | 5.0 | 5.0 | 5.0 | 5.0 | 5.0 | 5.0 |
| cooling rate (° C./sec) | | 3 | 1 | 1 | 3 | 3 | 0.8 |

| | | toner particle | | | | |
|---|---|---|---|---|---|---|
| | | 18 | 19 | 20 | 21 | 22 |
| production method | | suspension polymerization | suspension polymerization | suspension polymerization | suspension polymerization | pulverization |
| resin ratio | resin A | 97.0 | 97.0 | 97.0 | 97.0 | 97.0 |
| | resin B | 3.0 | 3.0 | 3.0 | 3.0 | 3.0 |
| | shell monomer | — | — | — | — | — |
| | | 0.0 | 0.0 | 0.0 | 0.0 | 0.0 |
| resin A | styrene | 80.9 | 80.9 | 80.0 | 79.4 | 80.9 |
| | BA | 15.0 | 15.0 | 15.0 | 15.0 | 15.0 |
| | MMA | 0.0 | 0.0 | 0.0 | 0.0 | 0.0 |
| | long-chain Ac | decyl acrylate | decyl acrylate | decyl acrylate | decyl acrylate | decyl acrylate |
| | | 2.1 | 2.1 | 2.1 | 2.1 | 2.1 |
| | divinylbenzene | 1.0 | 1.0 | 1.0 | 1.0 | 1.0 |
| | quaternary ammonium salt | — | — | benzyldimethyl-ammoniumethyl methacrylate chloride | benzyldimethyl-ammoniumethyl methacrylate chloride | — |
| | | 0.0 | 0.0 | 0.9 | 1.5 | 0.0 |
| molecular weight modifier | molecular weight modifier | tetraethyl-thiuram disulfide | tetraethyl-thiuram disulfide | tetraethyl-thiuram disulfide | tetraethyl-thiuram disulfide | tetraethyl-thiuram disulfide |
| | amount of addition | 1.0 | 1.0 | 1.0 | 1.0 | 1.0 |
| polymerization initiator | t-butyl peroxy-2-ethylhexanoate | 5.0 | 5.0 | 5.0 | 5.0 | 5.0 |
| resin B | resin B No. | resin B5 | resin B6 | resin B1 | resin B1 | resin B1 |
| | styrene | 81.0 | 81.0 | 81.0 | 81.0 | 81.0 |
| | BA | 15.1 | 14.5 | 16.0 | 16.0 | 16.0 |
| | MMA | 0.0 | 0.0 | 0.0 | 0.0 | 0.0 |
| | quaternary ammonium salt | benzyldimethyl-ammoniumethyl methacrylate chloride | benzyldimethyl-ammoniumethyl methacrylate chloride | benzyldimethyl-ammoniumethyl methacrylate chloride | benzyldimethyl-ammoniumethyl methacrylate chloride | benzyldimethyl-ammoniumethyl methacrylate chloride |
| | | 3.0 | 3.0 | 3.0 | 3.0 | 3.0 |
| | lauryl acrylate | lauryl acrylate | lauryl acrylate | — | — | — |
| | | 0.9 | 1.5 | 0.0 | 0.0 | 0.0 |
| ester compound | ester compound | ester compound 1 | ester compound 1 | ester compound 1 | ester compound 1 | ester compound 1 |
| | amount of addition | 20.0 | 20.0 | 20.0 | 20.0 | 20.0 |
| hydrocarbon | hydrocarbon | HNP51 | HNP51 | HNP51 | HNP51 | HNP51 |
| | amount of addition | 5.0 | 5.0 | 5.0 | 5.0 | 5.0 |
| cooling rate (° C./sec) | | 0.8 | 0.8 | 0.8 | 0.8 | 3.0 |

TABLE 3-4

| | toner | | | | | |
|---|---|---|---|---|---|---|
| | 12 | 13 | 14 | 15 | 16 | 17 |
| content of resin A in chloroform-soluble matter of toner particle | 97 | 71 | 99 | 100 | 61 | 97 |
| content of formula (1) monomer unit in resin A | 2.1 | 2.1 | 2.1 | 2.1 | 2.1 | 2.1 |
| content of formula (2) monomer unit in resin A | 80.9 | 80.9 | 80.9 | 80.9 | 80.9 | 80.9 |
| presence/absence of sulfide group in resin A | ○ | ○ | ○ | ○ | ○ | ○ |
| presence/absence of formula (8) in resin A | x | x | x | x | x | x |

TABLE 3-4-continued

| | | | | | | | |
|---|---|---|---|---|---|---|---|
| content of formula (3) monomer unit in resin A | | 0.0 | 0.0 | 0.0 | 0.0 | 0.0 | 0.0 |
| content of formula (4) monomer unit in resin B | | 81.0 | 81.0 | 81.0 | 81.0 | 81.0 | 81.0 |
| content of formula (1) monomer unit in resin B | | 0.0 | 0.0 | 0.0 | 0.0 | 0.0 | 0.0 |
| SP value | SPm | 18.89 | 18.89 | 18.89 | 18.89 | 18.89 | 18.89 |
| relationship | SPw | 17.57 | 17.57 | 17.57 | 17.57 | 17.57 | 17.57 |
| | \| SPm − SPw \| | 1.32 | 1.32 | 1.32 | 1.32 | 1.32 | 1.32 |
| G'' (dyn/cm$^2$) | | 5.0 × 10^5 | 7.1 × 10^5 | 7.0 × 10^5 | 6.5 × 10^5 | 7.0 × 10^5 | 8.0 × 10^5 |
| average circularity | | 0.98 | 0.95 | 0.98 | 0.98 | 0.95 | 0.98 |
| average number of ester compound domains | | 153 | 110 | 101 | 143 | 142 | 95 |
| average long diameter r1 | | 0.30 | 0.95 | 1.00 | 0.40 | 0.40 | 1.30 |
| surface nitrogen quantity index | | 0.3 | 5.0 | 0.2 | 0.1 | 5.5 | 0.2 |

| | | toner | | | | |
|---|---|---|---|---|---|---|
| | | 18 | 19 | 20 | 21 | 22 |
| content of resin A in chloroform-soluble matter of toner particle | | 97 | 97 | 97 | 97 | 97 |
| content of formula (1) monomer unit in resin A | | 2.1 | 2.1 | 2.1 | 2.1 | 2.1 |
| content of formula (2) monomer unit in resin A | | 80.9 | 80.9 | 80.0 | 79.4 | 80.9 |
| presence/absence of sulfide group in resin A | | ○ | ○ | ○ | ○ | ○ |
| presence/absence of formula (8) in resin A | | x | x | x | x | x |
| content of formula (3) monomer unit in resin A | | 0.0 | 0.0 | 0.9 | 1.5 | 0.0 |
| content of formula (4) monomer unit in resin B | | 81.0 | 81.0 | 81.0 | 81.0 | 81.0 |
| content of formula (1) monomer unit in resin B | | 0.9 | 1.5 | 0.0 | 0.0 | 0.0 |
| SP value | SPm | 18.89 | 18.89 | 18.89 | 18.89 | 18.89 |
| relationship | SPw | 17.57 | 17.57 | 17.57 | 17.57 | 17.57 |
| | \| SPm − SPw \| | 1.32 | 1.32 | 1.32 | 1.32 | 1.32 |
| G'' (dyn/cm$^2$) | | 8.3 × 10^5 | 8.5 × 10^5 | 8.7 × 10^5 | 8.9 × 10^5 | 8.1 × 10^5 |
| average circularity | | 0.98 | 0.98 | 0.98 | 0.98 | 0.95 |
| average number of ester compound domains | | 93 | 91 | 90 | 90 | 131 |
| average long diameter r1 | | 1.50 | 1.20 | 1.40 | 1.30 | 0.50 |
| surface nitrogen quantity index | | 0.2 | 0.2 | 0.2 | 0.2 | 0.1 |

TABLE 3-5

| | | toner particle | | | | | |
|---|---|---|---|---|---|---|---|
| | | 23 | 24 | 25 | 26 | 27 | 28 |
| production method | | suspension polymerization | suspension polymerization | suspension polymerization | suspension polymerization | suspension polymerization | suspension polymerization |
| resin ratio | resin A | 97.0 | 97.0 | 97.0 | 97.0 | 100.0 | 97.0 |
| | resin B | 2.0 | 2.0 | 2.0 | 2.0 | 0.0 | 2.0 |
| | shell monomer | — | — | — | — | — | — |
| | | 1.0 | 1.0 | 1.0 | 1.0 | 0.0 | 1.0 |
| resin A | styrene | 80.5 | 94.9 | 83.9 | 2.9 | 83.9 | 83.9 |
| | BA | 17.0 | 0.0 | 11.0 | 11.0 | 11.0 | 11.0 |
| | MMA | 0.0 | 0.0 | 0.0 | 81.0 | 0.0 | 0.0 |
| | long-chain Ac | lauryl acrylate | stearyl methacrylate | octyl acrylate | lauryl acrylate | lauryl acrylate | lauryl acrylate |
| | | 0.5 | 3.1 | 3.1 | 3.1 | 3.1 | 3.1 |
| | divinylbenzene | 1.0 | 1.0 | 1.0 | 1.0 | 1.0 | 1.0 |
| | quaternary | — | — | — | — | — | — |
| | ammonium salt | 0.0 | 0.0 | 0.0 | 0.0 | 0.0 | 0.0 |
| molecular weight modifier | molecular weight modifier | tetraethyl-thiuram disulfide | tetraethyl-thiuram disulfide | tetraethyl-thiuram disulfide | tetraethyl-thiuram disulfide | tetraethyl-thiuram disulfide | tetraethyl-thiuram disulfide |
| | amount of addition | 1.0 | 1.0 | 1.0 | 1.0 | 1.0 | 1.0 |

TABLE 3-5-continued

| | | | | | | | |
|---|---|---|---|---|---|---|---|
| polymerization initiator | t-butyl peroxy-2-ethylhexanoate | 5.0 | 5.0 | 5.0 | 5.0 | 5.0 | 5.0 |
| resin B | resin B No. | resin B1 | resin B1 | resin B1 | resin B1 | — | resin B1 |
| | styrene | 81.0 | 81.0 | 81.0 | 81.0 | | 81.0 |
| | BA | 16.0 | 16.0 | 16.0 | 16.0 | | 16.0 |
| | MMA | 0.0 | 0.0 | 0.0 | 0.0 | | 0.0 |
| | quaternary ammonium salt | benzyldimethyl-ammoniumethyl methacrylate chloride 3.0 | benzyldimethyl-ammoniumethyl methacrylate chloride 3.0 | benzyldimethyl-ammoniumethyl methacrylate chloride 3.0 | benzyldimethyl-ammoniumethyl methacrylate chloride 3.0 | | benzyldimethyl-ammoniumethyl methacrylate chloride 3.0 |
| | lauryl acrylate | — 0.0 | — 0.0 | — 0.0 | — 0.0 | | — 0.0 |
| ester compound | ester compound | ester compound 1 | ester compound 1 | ester compound 1 | ester compound 1 | ester compound 1 | ester compound 5 |
| | amount of addition | 20.0 | 20.0 | 20.0 | 20.0 | 20.0 | 20.0 |
| hydrocarbon | hydrocarbon | HNP51 | HNP51 | HNP51 | HNP51 | HNP51 | HNP51 |
| | amount of addition | 5.0 | 5.0 | 5.0 | 5.0 | 5.0 | 5.0 |
| cooling rate (° C./sec) | | 3.0 | 3.0 | 3.0 | 3.0 | 3.0 | 3.0 |

| | | toner particle | | | |
|---|---|---|---|---|---|
| | | 29 | 30 | 31 | 32 |
| production method | | suspension polymerization | pulverization | suspension polymerization | suspension polymerization |
| resin ratio | resin A | 97.0 | 45.0 | 97.0 | 97.0 |
| | resin B | 2.0 | 54.0 | 2.0 | 2.0 |
| | shell monomer | — 1.0 | — 1.0 | — 1.0 | — 1.0 |
| resin A | styrene | 83.9 | 83.9 | 47.9 | 83.9 |
| | BA | 11.0 | 11.0 | 10.0 | 11.0 |
| | MMA | 0.0 | 0.0 | 37.0 | 0.0 |
| | long-chain Ac | lauryl acrylate 3.1 | lauryl acrylate 3.1 | lauryl acrylate 3.1 | lauryl acrylate 3.1 |
| | divinylbenzene | 1.0 | 1.0 | 1.0 | 1.0 |
| | quaternary ammonium salt | — 0.0 | — 0.0 | — 0.0 | — 0.0 |
| molecular weight modifier | molecular weight modifier | tetraethyl-thiuram disulfide | tetraethyl-thiuram disulfide | tetraethyl-thiuram disulfide | tetraethyl-thiuram disulfide |
| | amount of addition | 1.0 | 1.0 | 1.0 | 1.0 |
| polymerization initiator | t-butyl peroxy-2-ethylhexanoate | 5.0 | 5.0 | 5.0 | 5.0 |
| resin B | resin B No. | resin B1 | resin B1 | resin B1 | resin B7 |
| | styrene | 81.0 | 81.0 | 81.0 | 45.0 |
| | BA | 16.0 | 16.0 | 16.0 | 17.0 |
| | MMA | 0.0 | 0.0 | 0.0 | 35.0 |
| | quaternary ammonium salt | benzyldimethyl-ammoniumethyl methacrylate chloride 3.0 | benzyldimethyl-ammoniumethyl methacrylate chloride 3.0 | benzyldimethyl-ammoniumethyl methacrylate chloride 3.0 | benzyldimethyl-ammoniumethyl methacrylate chloride 3.0 |
| | lauryl acrylate | — 0.0 | — 0.0 | — 0.0 | — 0.0 |
| ester compound | ester compound | none | ester compound 1 | ester compound 1 | ester compound 1 |
| | amount of addition | none | 20.0 | 20.0 | 20.0 |
| hydrocarbon | hydrocarbon | HNP51 | HNP51 | HNP51 | HNP51 |
| | amount of addition | 5.0 | 5.0 | 5.0 | 5.0 |
| cooling rate (° C./sec) | | 3.0 | 3.0 | 3.0 | 3.0 |

TABLE 3-6

| | | toner | | | | |
|---|---|---|---|---|---|---|
| | | 23 | 24 | 25 | 26 | 27 |
| content of resin A in chloroform-soluble matter of toner particle | | 97 | 97 | 97 | 97 | 100 |
| content of formula (1) monomer unit in resin A | | 0.5 | 3.1 | 3.1 | 3.1 | 3.1 |
| content of formula (2) monomer unit in resin A | | 80.5 | 94.9 | 83.9 | 2.9 | 83.9 |
| presence/absence of sulfide group in resin A | | ○ | ○ | ○ | ○ | ○ |
| presence/absence of formula (8) in resin A | | ○ | ○ | ○ | ○ | x |
| content of formula (3) monomer unit in resin A | | 0.0 | 0.0 | 0.0 | 0.0 | 0.0 |
| content of formula (4) monomer unit in resin B | | 81.0 | 81.0 | 81.0 | 81.0 | — |
| content of formula (1) monomer unit in resin B | | 0.0 | 0.0 | 0.0 | 0.0 | — |
| SP value | SPm | 18.72 | 18.72 | 19.13 | 18.72 | 18.72 |
| relationship | SPw | 17.57 | 17.57 | 17.57 | 17.57 | 17.57 |
| | \| SPm − SPw \| | 1.15 | 1.15 | 1.56 | 1.15 | 1.15 |
| G'' (dyn/cm$^2$) | | 7.3 × 10^5 | 3.0 × 10^4 | 5.9 × 10^5 | 2.8 × 10^5 | 2.7 × 10^5 |
| average circularity | | 0.98 | 0.98 | 0.98 | 0.98 | 0.98 |
| average number of ester compound domains | | 101 | 95 | 93 | 103 | 105 |
| average long diameter r1 | | 0.60 | 1.10 | 1.20 | 0.90 | 0.80 |
| surface nitrogen quantity index | | 0.19 | 0.15 | 0.15 | 0.16 | 0.00 |

| | | toner | | | | |
|---|---|---|---|---|---|---|
| | | 28 | 29 | 30 | 31 | 32 |
| content of resin A in chloroform-soluble matter of toner particle | | 97 | 97 | 45 | 97 | 97 |
| content of formula (1) monomer unit in resin A | | 3.1 | 3.1 | 3.1 | 3.1 | 3.1 |
| content of formula (2) monomer unit in resin A | | 83.9 | 83.9 | 83.9 | 47.9 | 83.9 |
| presence/absence of sulfide group in resin A | | ○ | ○ | ○ | ○ | ○ |
| presence/absence of formula (8) in resin A | | ○ | ○ | ○ | ○ | ○ |
| content of formula (3) monomer unit in resin A | | 0.0 | 0.0 | 0.0 | 0.0 | 0.0 |
| content of formula (4) monomer unit in resin B | | 81.0 | 81.0 | 81.0 | 81.0 | 45.0 |
| content of formula (1) monomer unit in resin B | | 0.0 | 0.0 | 0.0 | 0.0 | 0.0 |
| SP value | SPm | 18.72 | 18.72 | 18.72 | 18.72 | 18.72 |
| relationship | SPw | 18.27 | — | 17.57 | 17.57 | 17.57 |
| | \| SPm − SPw \| | 0.45 | — | 1.15 | 1.15 | 1.15 |
| G'' (dyn/cm$^2$) | | 8.3 × 10^5 | 2.0 × 10^6 | 1.3 × 10^6 | 1.0 × 10^6 | 0.9 × 10^6 |
| average circularity | | 0.98 | 0.98 | 0.98 | 0.98 | 0.98 |
| average number of ester compound domains | | 103 | 1 | 115 | 63 | 71 |
| average long diameter r1 | | 0.70 | 2.10 | 0.60 | 1.30 | 1.20 |
| surface nitrogen quantity index | | 0.18 | 0.10 | 0.15 | 0.15 | 0.15 |

The correspondence between the toner and toner particle in the individual examples and comparative examples is given in Table 4.

TABLE 4

| | toner | toner particle |
|---|---|---|
| Example 1 | 1 | 1 |
| Example 2 | 2 | 2 |
| Example 3 | 3 | 3 |
| Example 4 | 4 | 4 |
| Example 5 | 5 | 5 |

TABLE 4-continued

| | toner | toner particle |
|---|---|---|
| Example 6 | 6 | 6 |
| Example 7 | 7 | 7 |
| Example 8 | 8 | 8 |
| Example 9 | 9 | 9 |
| Example 10 | 10 | 10 |
| Example 11 | 11 | 11 |
| Example 12 | 12 | 12 |
| Example 13 | 13 | 13 |
| Example 14 | 14 | 14 |

TABLE 4-continued

| | toner | toner particle |
|---|---|---|
| Example 15 | 15 | 15 |
| Example 16 | 16 | 16 |
| Example 17 | 17 | 17 |
| Example 18 | 18 | 18 |
| Example 19 | 19 | 19 |
| Example 20 | 20 | 20 |
| Example 21 | 21 | 21 |
| Example 22 | 22 | 22 |
| Comparative Example 1 | 23 | 23 |
| Comparative Example 2 | 24 | 24 |
| Comparative Example 3 | 25 | 25 |
| Comparative Example 4 | 26 | 26 |
| Comparative Example 5 | 27 | 27 |
| Comparative Example 6 | 28 | 28 |
| Comparative Example 7 | 29 | 29 |
| Comparative Example 8 | 30 | 30 |
| Comparative Example 9 | 31 | 31 |
| Comparative Example 10 | 32 | 32 |

Examples 1 to 22 and Comparative Examples 1 to 10

The evaluations described below were carried out using toners 1 to 32.

The results of the evaluations are given in Tables 5-1 to 5-3.

TABLE 5-1

| | | Example 1 | Example 2 | Example 3 | Example 4 | Example 5 | Example 6 |
|---|---|---|---|---|---|---|---|
| | toner | 1 | 2 | 3 | 4 | 5 | 6 |
| evaluation 1 | fogging after durability testing and standing, in a high-temperature, high-humidity environment | A 0.1 | A 0.1 | A 0.1 | A 0.1 | A 0.3 | A 0.4 |
| evaluation 2 | nontransfer fogging after durability testing in a low-temperature, low-humidity environment | A 0.1 | A 0.1 | A 0.1 | A 0.1 | B 0.6 | A 0.1 |
| evaluation 3 | low-temperature fixability | A 180 | A 180 | A 180 | A 185 | B 200 | A 190 |
| evaluation 4 | adherence between paper and fixed image | A 98 | A 97 | A 97 | A 95 | C 79 | A 96 |
| evaluation 5 | halftone density uniformity after durability testing in a high-temperature, high-humidity environment | A 0.01 | A 0.02 | A 0.02 | A 0.02 | C 0.10 | A 0.03 |
| evaluation 6 | solid density uniformity after durability testing in a low-temperature, low-humidity environment | A 0.01 | A 0.02 | A 0.02 | A 0.02 | B 0.06 | A 0.03 |
| evaluation 7 | density uniformity after durability testing using rough paper | A 0.01 | A 0.01 | A 0.02 | A 0.02 | A 0.04 | A 0.03 |

| | | Example 7 | Example 8 | Example 9 | Example 10 | Example 11 |
|---|---|---|---|---|---|---|
| | toner | 7 | 8 | 9 | 10 | 11 |
| evaluation 1 | fogging after durability testing and standing, in a high-temperature, high-humidity environment | A 0.4 | B 0.5 | B 0.6 | B 0.6 | B 0.7 |
| evaluation 2 | nontransfer fogging after durability testing in a low-temperature, low-humidity environment | A 0.1 | A 0.1 | B 0.8 | B 0.8 | B 0.9 |
| evaluation 3 | low-temperature fixability | A 180 | A 195 | B 200 | B 200 | C 210 |
| evaluation 4 | adherence between paper and fixed image | A 98 | A 91 | B 89 | B 88 | B 84 |
| evaluation 5 | halftone density uniformity after durability testing in a high-temperature, high-humidity environment | A 0.03 | A 0.04 | B 0.06 | B 0.06 | B 0.06 |
| evaluation 6 | solid density uniformity after durability testing in a low-temperature, low-humidity environment | A 0.04 | A 0.04 | B 0.07 | B 0.07 | B 0.07 |

TABLE 5-1-continued

| | | | | | | |
|---|---|---|---|---|---|---|
| evaluation 7 | density uniformity after durability testing using rough paper | A<br>0.03 | B<br>0.06 | A<br>0.04 | A<br>0.04 | A<br>0.04 |

TABLE 5-2

| | | Example 12 | Example 13 | Example 14 | Example 15 | Example 16 | Example 17 |
|---|---|---|---|---|---|---|---|
| | | toner | | | | | |
| | | 12 | 13 | 14 | 15 | 16 | 17 |
| evaluation 1 | fogging after durability testing and standing, in a high-temperature, high-humidity environment | C<br>1.0 | C<br>1.7 | C<br>1.1 | C<br>1.2 | C<br>1.8 | C<br>1.2 |
| evaluation 2 | nontransfer fogging after durability testing in a low-temperature, low-humidity environment | C<br>1.0 | C<br>1.8 | C<br>1.1 | C<br>1.3 | C<br>1.9 | C<br>1.1 |
| evaluation 3 | low-temperature fixability | C<br>210 | C<br>215 | C<br>210 | C<br>210 | C<br>215 | C<br>210 |
| evaluation 4 | adherence between paper and fixed image | B<br>83 | B<br>81 | B<br>84 | B<br>84 | B<br>81 | B<br>83 |
| evaluation 5 | halftone density uniformity after durability testing in a high-temperature, high-humidity environment | B<br>0.07 | B<br>0.08 | B<br>0.08 | C<br>0.13 | B<br>0.09 | B<br>0.08 |
| evaluation 6 | solid density uniformity after durability testing in a low-temperature, low-humidity environment | B<br>0.08 | B<br>0.08 | B<br>0.09 | B<br>0.09 | C<br>0.13 | B<br>0.09 |
| evaluation 7 | density uniformity after durability testing using rough paper | A<br>0.04 | C<br>0.12 | A<br>0.04 | A<br>0.04 | C<br>0.13 | B<br>0.07 |

| | | Example 18 | Example 19 | Example 20 | Example 21 | Example 22 |
|---|---|---|---|---|---|---|
| | | toner | | | | |
| | | 18 | 19 | 20 | 21 | 22 |
| evaluation 1 | fogging after durability testing and standing, in a high-temperature, high-humidity environment | C<br>1.5 | C<br>1.6 | C<br>1.4 | C<br>1.5 | C<br>1.9 |
| evaluation 2 | nontransfer fogging after durability testing in a low-temperature, low-humidity environment | C<br>1.5 | C<br>1.5 | C<br>1.4 | C<br>1.4 | C<br>1.9 |
| evaluation 3 | low-temperature fixability | C<br>210 | C<br>210 | C<br>210 | C<br>210 | C<br>215 |
| evaluation 4 | adherence between paper and fixed image | B<br>83 | B<br>82 | B<br>82 | B<br>82 | B<br>80 |
| evaluation 5 | halftone density uniformity after durability testing in a high-temperature, high-humidity environment | B<br>0.08 | C<br>0.14 | B<br>0.08 | B<br>0.08 | C<br>0.14 |
| evaluation 6 | solid density uniformity after durability testing in a low-temperature, low-humidity environment | B<br>0.09 | B<br>0.09 | B<br>0.09 | C<br>0.14 | B<br>0.09 |
| evaluation 7 | density uniformity after durability testing using rough paper | B<br>0.08 | B<br>0.08 | B<br>0.08 | B<br>0.09 | C<br>0.14 |

TABLE 5-3

| | | Comparative Example 1 | Comparative Example 2 | Comparative Example 3 | Comparative Example 4 | Comparative Example 5 |
|---|---|---|---|---|---|---|
| | | toner | | | | |
| | | 23 | 24 | 25 | 26 | 27 |
| evaluation 1 | fogging after durability testing and standing, in a high-temperature, high-humidity environment | D 2.3 | D 2.5 | D 2.3 | D 2.2 | D 2.8 |
| evaluation 2 | nontransfer fogging after durability testing in a low-temperature, low-humidity environment | D 2.5 | D 2.4 | D 2.6 | D 2.2 | D 2.9 |
| evaluation 3 | low-temperature fixability | D 220 | B 205 | D 220 | C 215 | C 215 |
| evaluation 4 | adherence between paper and fixed image | D 67 | D 71 | D 68 | D 69 | D 70 |
| evaluation 5 | halftone density uniformity after durability testing in a high-temperature, high-humidity environment | D 0.17 | D 0.16 | D 0.19 | D 0.18 | D 0.23 |
| evaluation 6 | solid density uniformity after durability testing in a low-temperature, low-humidity environment | D 0.17 | D 0.18 | D 0.19 | D 0.17 | D 0.22 |
| evaluation 7 | density uniformity after durability testing using rough paper | C 0.14 | D 0.18 | C 0.14 | C 0.14 | C 0.14 |

| | | Comparative Example 6 | Comparative Example 7 | Comparative Example 8 | Comparative Example 9 | Comparative Example 10 |
|---|---|---|---|---|---|---|
| | | toner | | | | |
| | | 28 | 29 | 30 | 31 | 32 |
| evaluation 1 | fogging after durability testing and standing, in a high-temperature, high-humidity environment | D 2.6 | D 2.2 | D 2.8 | D 2.7 | D 2.8 |
| evaluation 2 | nontransfer fogging after durability testing in a low-temperature, low-humidity environment | D 2.7 | D 2.1 | D 2.9 | D 2.7 | D 2.8 |
| evaluation 3 | low-temperature fixability | D 225 | D 230 | D 230 | D 220 | D 220 |
| evaluation 4 | adherence between paper and fixed image | D 70 | D 71 | D 67 | D 69 | D 68 |
| evaluation 5 | halftone density uniformity after durability testing in a high-temperature, high-humidity environment | D 0.17 | D 0.16 | D 0.22 | D 0.22 | D 0.22 |
| evaluation 6 | solid density uniformity after durability testing in a low-temperature, low-humidity environment | D 0.17 | D 0.17 | D 0.22 | D 0.22 | D 0.22 |
| evaluation 7 | density uniformity after durability testing using rough paper | D 0.20 | D 0.20 | C 0.14 | C 0.14 | C 0.14 |

Evaluation 1: Evaluation of the Fogging after Durability Testing in a High-Temperature, High-Humidity Environment The following were used in the evaluation procedure: an HL-5470DW (monochrome laser printer from Brother Industries, Ltd.), which employed a cleanerless system, and a cartridge from which the paper dust collection roller had been removed. The toner and the image-forming apparatus were both held for one day in a high-temperature, high-humidity environment (temperature=32.5° C., humidity=80% RH); 15,000 prints were then output in intermittent mode in this same environment of a horizontal line image having a print percentage of 1%; and 3 additional prints of a solid image were output. This was followed by standing for 30 days, after which the fogging after standing was evaluated.

Long-term standing in a high-temperature, high-humidity environment serves to facilitate a decline in the charging performance of the toner, and to facilitate the occurrence of image fogging, more than in an ordinary evaluation in a high-temperature, high-humidity environment. In addition, by carrying out the evaluation without removing/inserting the process cartridge during the standing interval and with the unit power remaining on, the pre-printing rotation time related to toner charging is made short, which as a consequence provides a more rigorous evaluation for the charge retention behavior by the toner. A4 Century Star paper (Century Textiles and Industries Ltd.), which is a talc paper, was used as the evaluation paper.

To evaluate the fogging, 15,000 prints were output followed by output of 3 prints of a solid image, and this was followed by the output of a full white image (white image 1) using paper with an attached sticky note in order to mask a portion of the printed surface of the image.

Standing was then carried out for 30 days in the high-temperature, high-humidity environment with the process cartridge continuing to be inserted in the unit and without turning off the power supply to the unit. This was followed by the output of a full white image (white image 2) using paper on which a sticky note had been applied in order to mask a portion of the printed surface of the image.

With white image 2, the sticky note was peeled off and the reflectance (%) was then measured at five points in the area where the sticky note had been placed and at five points in the area where the sticky note had not been applied. The average values were calculated, the difference between the average values was then calculated, and this was used as the fogging after long-term standing.

The reflectance was measured using a digital white photometer (Model TC-6D, Tokyo Denshoku Co., Ltd., a green filter was used). Lower values indicate a better fogging behavior, and the evaluation was performed using the following criteria.

Scores of C or better were regarded as good.

Evaluation Criteria

A. the post-standing fogging is less than 0.5%

B. the post-standing fogging is at least 0.5%, but less than 1.0%

C. the post-standing fogging is at least 1.0%, but less than 2.0%

D. the post-standing fogging is equal to or greater than 2.0%

Evaluation 2: Evaluation of the Nontransfer Fogging after Durability Testing in a Low-Temperature, Low-Humidity Environment The following were used in the evaluation procedure: an HL-5470DW (monochrome laser printer from Brother Industries, Ltd.), which employed a cleanerless system, and a cartridge from which the paper dust collection roller had been removed. The toner and the image-forming apparatus were both held for one day in a low-temperature, low-humidity environment (temperature=15° C., humidity=5% RH); 15,000 prints were then output in intermittent mode in this same environment of a horizontal line image having a print percentage of 1%; and 3 additional prints of a solid image were output.

The nontransfer fogging after the durability test was then evaluated using the following procedure. Paper was prepared that was masked, by the attachment of a sticky note, at the location where the image from the second rotation of the photosensitive drum was output (photosensitive drum pitch=approximately 94.2 mm). Specifically, paper was prepared that was masked by attaching a sticky note at the center of the location 99 mm to 124 mm from the leading edge of the paper, and an image having a 20 mm-wide solid black band (solid band image 1) was output using 5 mm for the leading edge margin.

Nontransfer fogging is produced at the position 104 to 124 mm from the paper leading edge of the solid band image 1. At the region 104 mm to 124 mm from the paper leading edge of the solid band image 1, the sticky note was peeled off and the reflectance (%) was then measured at five points in the area where the sticky note had been placed and at five points in the area where the sticky note had not been applied. The average values were calculated, the difference between the average values was then calculated, and this was used as the nontransfer fogging. The evaluation was performed using the following criteria.

Evaluation Criteria

A. the nontransfer fogging is less than 0.5%

B. the nontransfer fogging is at least 0.5%, but less than 1.0%

C. the nontransfer fogging is at least 1.0%, but less than 2.0%

D. the nontransfer fogging is at least 2.0%

Evaluation 3: Evaluation of the Low-Temperature Fixability

The low-temperature fixability was evaluated in a low-temperature, low-humidity environment (temperature=15° C., humidity=5% RH) using an HL-5470DW (monochrome laser printer from Brother Industries, Ltd.) and a cartridge from which the paper dust collection roller had been removed. This image-forming apparatus had also been modified to enable the fixation temperature at its fixing unit to be freely settable.

Using this apparatus, and while adjusting the fixation temperature at the fixing unit in 5° C. steps in the range from 180° C. to 230° C., a full black solid image (solid black image 1) with a print percentage of 100% and a margin of 5 mm was output using A4 Century Star paper (Century Textiles and Industries Ltd.), which is a talc paper, as the evaluation paper. When this was done, a visual evaluation was made of whether blank dots were present in the solid image region of the solid black image 1; the fixing lower limit temperature was designated as the lowest temperature at which blank dots were not produced; and this fixing lower limit temperature was used to evaluate the low-temperature fixability.

Evaluation Criteria

A: The fixing lower limit temperature is less than 200° C.

B: The fixing lower limit temperature is at least 200° C., but less than 210° C.

C: The fixing lower limit temperature is at least 210° C., but less than 220° C.

D: The fixing lower limit temperature is equal to or greater than 220° C.

Evaluation 4: Adherence Between the Fixed Image and Paper

The adherence between the fixed image and paper was evaluated in a low-temperature, low-humidity environment (temperature=15° C., humidity=5% RH) using an HL-5470DW (monochrome laser printer from Brother Industries, Ltd.) and a cartridge from which the paper dust collection roller had been removed. This image-forming apparatus had also been modified to enable the fixation temperature at its fixing unit to be freely settable.

While set to the fixing lower limit temperature obtained in Evaluation 3, three prints were then output of a halftone image 1 that had 5 mm for the leading edge margin and the right and left margins and that had a 5 mm×5 mm halftone patch region at three locations, i.e., the left, right, and center, and this at three locations on a 30-mm interval in the longitudinal direction, for a total of nine locations. The adherence to the paper was evaluated by evaluating the halftone density retention percentage pre-rubbing versus post-rubbing using the second print of the image.

A halftone image was used because this enables a rigorous evaluation to be made: since there are numerous elements formed by an isolated dot of toner, removal of the toner from the paper is facilitated when the image is rubbed. A4 Century Star paper (Century Textiles and Industries Ltd.), which is a talc paper, was used as the evaluation paper. Talc paper supports a rigorous evaluation since, due to the filler, paper/toner adherence is readily reduced in comparison with ordinary paper.

The density of the nine halftone patch regions was measured with a MacBeth reflection densitometer (MacBeth Corporation), and density adjustment of the image-forming apparatus was performed so as to adjust the average value of the halftone patch region densities to from 0.70 to 0.80. Specifically, the density of the nine halftone patch regions was measured on the image pre-rubbing using a MacBeth reflection densitometer (MacBeth Corporation) and the average value thereof was determined (initial density).

Each of the nine halftone patch regions on the image was rubbed ten times with lens-cleaning paper carrying a load of 55 g/$cm^2$; the density of each of the halftone patches was then measured with a MacBeth reflection densitometer (MacBeth Corporation); and the average value was calculated (post-rubbing density).

The post-rubbing density was divided by the initial density and this was multiplied by 100 to calculate the post-rubbing density retention percentage, and the evaluation was performed using the following criteria.

Evaluation Criteria

A. the post-rubbing density retention percentage is at least 90%

B. the post-rubbing density retention percentage is at least 80%, but less than 90%

C. the post-rubbing density retention percentage is at least 75%, but less than 80%

D. the post-rubbing density retention percentage is less than 75%

Evaluation 5: Halftone Density Uniformity after Durability Testing in a High-Temperature, High-Humidity Environment The following were used in the evaluation procedure: an HL-5470DW (monochrome laser printer from Brother Industries, Ltd.), which employed a cleanerless system, and a cartridge from which the paper dust collection roller had been removed. The toner and the image-forming apparatus were both held for one day in a high-temperature, high-humidity environment (temperature=32.5° C., humidity=80% RH), and 15,000 prints were then output in intermittent mode in this same environment of a horizontal line image having a print percentage of 1%. A4 Century Star paper (Century Textiles and Industries Ltd.), which is a talc paper, was used as the evaluation paper.

This was followed by the output of a halftone image 2, in which a 20 mm×20 mm solid black patch was disposed in alternation with a 20 mm×20 mm solid white patch, with a 5 mm leading edge margin, followed by the disposition of a full-surface halftone image.

The halftone density—at the location, for the second rotation of the photosensitive drum (photosensitive drum pitch=approximately 94.2 mm), where the image was output of the solid black patch and the solid white patch of the aforementioned image—was designated, respectively, the halftone density after solid black and the halftone density after solid white, and the halftone density uniformity after durability testing was determined as the difference between the two. This evaluation is a rigorous evaluation because a difference in toner charging performance is readily produced after solid white and after solid black and the halftone image density is sensitive to the influence of the charging performance.

Specifically, at the position 99 mm to 119 mm from the leading edge of the paper in the halftone image 2, the density of the halftone image after the solid black was measured at 10 points and the average value was taken and used as the halftone density after solid black. Similarly, the density of the halftone image after the solid white was measured at 10 points and the average value was taken and used as the halftone density after solid white.

Evaluation Criteria

A. The halftone density difference after durability testing is less than 0.05.

B. The halftone density difference after durability testing is at least 0.05, but less than 0.10.

C. The halftone density difference after durability testing is at least 0.10, but less than 0.15.

D. The halftone density difference after durability testing is at least 0.15.

Evaluation 6: Solid Density Uniformity after Durability Testing in a Low-Temperature, Low-Humidity Environment The following were used in the evaluation procedure: an HL-5470DW (monochrome laser printer from Brother Industries, Ltd.), which employed a cleanerless system, and a cartridge from which the paper dust collection roller had been removed. The toner and the image-forming apparatus were both held for one day in a low-temperature, low-humidity environment (temperature=15° C., humidity=5% RH); 15,000 prints were then output in intermittent mode in this same environment of a horizontal line image having a print percentage of 1%; 3 additional prints of a solid image were output; and the solid density uniformity was evaluated on the image on the second print. Specifically, the density of the solid image was measured at 100 points and the difference between the maximum value and minimum value was determined. A4 Century Star paper (Century Textiles and Industries Ltd.), which is a talc paper, was used as the evaluation paper.

Evaluation Criteria

A. The solid density difference after durability testing is less than 0.05.

B. The solid density difference after durability testing is at least 0.05, but less than 0.10.

C. The solid density difference after durability testing is at least 0.10, but less than 0.15.

D. The solid density difference after durability testing is at least 0.15.

Evaluation 7: Solid Density Uniformity after Durability Testing with Rough Paper The following were used in the evaluation procedure: an HL-5470DW (monochrome laser printer from Brother Industries, Ltd.), which employed a cleanerless system, and a cartridge from which the paper dust collection roller had been removed. The toner and the image-forming apparatus were both held for one day in a low-temperature, low-humidity environment (temperature=15° C., humidity=5% RH); 15,000 prints were then output in intermittent mode in this same environment of a horizontal line image having a print percentage of 1%; 3 additional prints of a solid image were output; and the solid density uniformity was evaluated using the image on the second print. Specifically, the density of the solid image was measured at 100 points and the difference between the maximum value and minimum value was determined.

Cotton Bond Light Cockle (letter, areal weight of 75 g, length 279 mm, width 216 mm), a rough paper, was used as the evaluation paper. Rough paper exhibits a large unevenness of the paper and readily produces in-plane non-uniformity of the transfer bias, and as a consequence provides for a rigorous evaluation of the transferability.

[Evaluation Criteria]

A. The solid density difference after durability testing is less than 0.05.

B. The solid density difference after durability testing is at least 0.05, but less than 0.10.

C. The solid density difference after durability testing is at least 0.10, but less than 0.15.

D. The solid density difference after durability testing is at least 0.15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-171590, filed Oct. 20, 2021, which is hereby incorporated by reference herein in its entirety.

What is claimed is:

1. A toner, comprising:

a toner particle comprising a binder resin and an ester compound;

the binder resin comprising a resin A and a resin B;

resin A comprising at least one member selected from the group consisting of a sulfide group and disulfide group, and comprising monomer units represented by formulae (1) and (2)

(1)

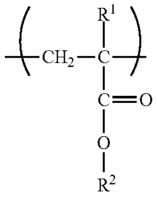

(2)

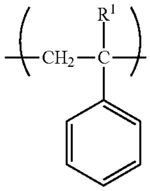

where $R^1$ represents a hydrogen atom or methyl group, $R^2$ represents a straight-chain alkyl group having 12 carbon atoms, and $R^{21}$ represents a hydrogen atom or methyl group;

resin B comprising monomer units represented by formulae (3) and (4)

(3)

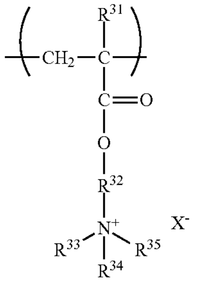

-continued (4)

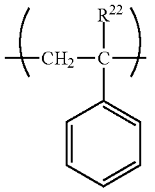

where $R^{31}$ represents a hydrogen atom or methyl group, $R^{32}$ represents an optionally halogen-substituted straight-chain or branched $C_{1-3}$ alkylene group, $R^{33}$ to $R^{35}$ independently represent a benzyl group, phenethyl group, or straight-chain, branched or cyclic $C_{1-6}$ alkyl group, X represents a counteranion, and $R^{22}$ represents a hydrogen atom or methyl group;

the ester compound being at least one compound selected from the group consisting of compounds represented by formulae (5), (6) and (7)

(5)

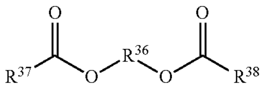

(6)

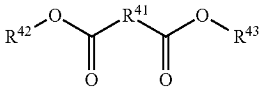

(7)

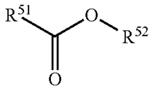

where $R^{36}$ and $R^{41}$ independently represent alkylene groups having 2 to 8 carbon atoms, and $R^{37}$, $R^{38}$, $R^{42}$, $R^{43}$, $R^{51}$ and $R^{52}$ independently represent a straight-chain alkyl group having 14 to 24 carbon atoms, wherein the toner has an average circularity of 0.97 to 0.99, a content of the resin A in a chloroform-soluble matter of the toner particle is at least 60 mass %, a content of the monomer unit represented by formula (1) in resin A is 2.0 to 15.0 mass %, a content of the monomer unit represented by formula (2) in resin A is at least 48.0 mass %, a content of the monomer unit represented by formula (4) in resin B is at least 48.0 mass %, SPm is 18.00 to 19.00, and $|SPm-SPw| \leq 1.50$ when SPm $(J/cm^3)^{1/2}$ is an SP value of the monomer unit represented by formula (1) and SPw $(J/cm^3)^{1/2}$ is an SP value of the ester compound, and an average number of domains of the ester compound present in a toner cross section observed using a scanning transmission electron microscope is at least 250, and r1 is not greater than 1.00 μm when r1 (μm) is an average long diameter of the domains.

2. The toner according to claim 1, wherein the monomer unit represented by formula (1) is 3.0 to 15.0 mass % of resin A.

3. The toner according to claim 1, wherein resin A comprises a monomer unit represented by formula (8)

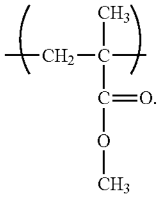

(8)

4. The toner according to claim 1, wherein a loss elastic modulus G" of the toner at 100° C. is not more than $3.0\times10^5$ ($dyn/cm^2$) in dynamic viscoelastic measurement of the toner.

5. The toner according to claim 1, which has a surface quantity index of 0.2 to 5.0 atomic % measured using x-ray photoelectron spectroscopic analysis, which is an amount of N relative to a total amount of C, N, O and Si.

6. The toner according to claim 1, wherein a content of the monomer unit represented by formula (3) in resin A is less than 1.0 mass %, and a content of the monomer unit represented by formula (1) in resin B is less than 1.0 mass %.

7. The toner according to claim 1, wherein the toner particle is a core-shell type toner particle having a core particle comprising the binder resin and having a shell on a surface of the core particle, the shell comprises a polymer of an alkyl (meth)acrylate ester, and the alkyl (meth)acrylate ester is at least one member selected from the group consisting of alkyl (meth) acrylate esters having an alkyl group having 1 to 4 carbon atoms.

8. The toner according to claim 1, wherein r1 is not greater than 0.10 μm.

* * * * *